US012538177B2

(12) United States Patent
Zeng et al.

(10) Patent No.: US 12,538,177 B2
(45) Date of Patent: Jan. 27, 2026

(54) LOAD BALANCING POLICY DETERMINING METHOD AND APPARATUS

(71) Applicant: Huawei Technologies Co., Ltd., Shenzhen (CN)

(72) Inventors: Yu Zeng, Shanghai (CN); Tingting Geng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 71 days.

(21) Appl. No.: 18/431,536

(22) Filed: Feb. 2, 2024

(65) Prior Publication Data

US 2024/0179568 A1 May 30, 2024

Related U.S. Application Data

(63) Continuation of application No. PCT/CN2022/109520, filed on Aug. 1, 2022.

(30) Foreign Application Priority Data

Aug. 4, 2021 (CN) .......................... 202110891977.7

(51) Int. Cl.
*H04W 28/08* (2023.01)
*H04L 47/127* (2022.01)
*H04W 28/086* (2023.01)

(52) U.S. Cl.
CPC ....... *H04W 28/0942* (2020.05); *H04W 28/08* (2013.01)

(58) Field of Classification Search
CPC ............. H04W 28/0942; H04W 28/08; H04W 28/0861; H04L 47/127
See application file for complete search history.

(56) References Cited

U.S. PATENT DOCUMENTS

| 2015/0208280 A1* | 7/2015 | Lorca Hernando ......................... H04W 28/0808 370/235 |
| 2017/0078895 A1* | 3/2017 | Sriram .................. H04W 24/02 |

(Continued)

FOREIGN PATENT DOCUMENTS

| CN | 107517481 A | * 12/2017 | ............ H04W 48/06 |
| CN | 108834079 A | * 11/2018 | ........... H04L 41/145 |

(Continued)

OTHER PUBLICATIONS

Basma Mahdy, "Analysis of the Utilization of Mobile Network Base Stations Using Traffic Load Predictions," A thesis submitted to the Department of Electrical and Computer Engineering In conformity with the requirements for the degree of Master of Applied Science, Queen's University. (Year: 2020).*

(Continued)

*Primary Examiner* — Alina A Boutah
(74) *Attorney, Agent, or Firm* — SLATER MATSIL, LLP

(57) ABSTRACT

A load balancing policy determining method and apparatus are provided including: A first prediction module obtains first information of at least one first base station, where the first information is used to perform load prediction on the first base station, and the first information includes information about a first cell of the first base station and information about a first terminal device located in the first cell. The first prediction module determines load prediction information of the at least one first base station based on the first information of the at least one first base station and obtains load prediction information of at least one second base station, and further determines a load policy of the at least one first base station based on the load prediction information of the at least one first base station and the load (Continued)

prediction information of the at least one second base station.

20 Claims, 9 Drawing Sheets

(56) References Cited

U.S. PATENT DOCUMENTS

| | | | |
|---|---|---|---|
| 2021/0051519 A1 | 2/2021 | Bedekar et al. | |
| 2022/0046507 A1* | 2/2022 | Krishnan | H04W 36/22 |
| 2023/0105308 A1* | 4/2023 | Lee | H04W 24/10 370/235 |
| 2024/0196252 A1* | 6/2024 | Soldati | H04W 24/10 |

FOREIGN PATENT DOCUMENTS

| | | | | |
|---|---|---|---|---|
| CN | 110831052 A * | 2/2020 | | H04W 24/10 |
| CN | 111726833 A | 9/2020 | | |
| CN | 112822706 A * | 5/2021 | | H04W 24/06 |
| EP | 3284287 B1 * | 6/2019 | | H04L 45/22 |
| JP | WO2004093393 A1 * | 7/2006 | | H04L 47/125 |
| WO | WO-2014128341 A1 * | 8/2014 | | H04W 36/22 |
| WO | WO-2018155965 A1 * | 8/2018 | | H04W 36/22 |
| WO | WO-2021194176 A1 * | 9/2021 | | H04W 28/08 |
| WO | WO-2021230805 A1 * | 11/2021 | | H04W 76/15 |

OTHER PUBLICATIONS

Xie et al., "A Method of Cellular Base Station Traffic Prediction," Department of Communication Engineering, Faculty of Engineering, Yanbian University, Yanji, China., International Journal of Applied Science and Mathematics vol. 8, Issue 3, ISSN (Online): 2394-2894 (Year: 2021).*
3GPP TS 36.423 V16.5.0 (Apr. 2021),3rd Generation Partnership Project;Technical Specification Group Radio Access Network;Evolved Universal Terrestrial Radio Access Network (E-UTRAN);X2 application protocol (X2AP)(Release 16), total 500 pages.
3GPP TS 38.423 V16.5.0 (Apr. 2021), 3rd Generation Partnership Project;Technical Specification Group Radio Access Network;NG-RAN;Xn application protocol (XnAP)(Release 16), total 461 pages.
ZTE (Moderator): "SoD Standards Impact on Existing Nodes, Functions, and Interfaces", 3GPP Draft; R3-212690, vol. RAN WG3, No. Online; May 17, 2021-May 27, 2021, Jun. 4, 2021 (Jun. 4, 2021), XP052021494, total 33 pages.
CMCC: "Solutions for AI-based load balancing", 3GPP Draft; R3-212505, vol. RAN WG3, No. Online; May 17, 2021-May 28, 2021, May 7, 2021 (May 7, 2021), XP052002551, total 7 pages.

* cited by examiner

LOAD BALANCING POLICY DETERMINING METHOD AND APPARATUS

CROSS-REFERENCE TO RELATED APPLICATIONS

This application is a continuation of International Application No. PCT/CN2022/109520, filed on Aug. 1, 2022, which claims priority to Chinese Patent Application No. 202110891977.7, filed on Aug. 4, 2021. The disclosures of the aforementioned applications are herein incorporated by reference in their entireties.

TECHNICAL FIELD

This application relates to the field of communication technologies, and in particular, to a load balancing policy determining method and apparatus.

BACKGROUND

In an existing communication system, for example, a long term evolution (LTE) system and a 5G NR (New Radio) system, physical resource block utilization is close to a maximum limit value as a quantity of users in some cells increases, while resource utilization of another cell is extremely low. This problem may be usually resolved using a mobility load balancing (MLB) technology. To be specific, a base station determines a load status of a cell, and when load of the cell is high, transfers some terminal devices in the high-load cell to a low-load cell. For different systems, base stations may further exchange respective resource usage, to optimize network mobility parameter configuration, and finally balance inter-frequency or inter-system load.

In a conventional NR MLB technology, a base station may formulate different MLB policies based on current resource statuses of the base station and a neighboring base station. However, if network load of each base station fluctuates, reported resource usage of the base station also fluctuates. In this case, the MLB policy formulated only based on recently reported resource usage needs to be updated continuously, and a frequent change of a base station configuration and frequent reconfiguration of a UE are caused. Consequently, robustness of the MLB policy formulated in the conventional technology is poor. In addition, formulating the MLB policy in the conventional technology limits improvement of network performance. For example, a periodicity of reporting resource usage of the base station is T, and resource usage is reported once at a moment t, and in this case, an MLB policy formulated at the moment t is not applicable to a scenario in which network load fluctuates between the moment t and a moment t+T, and cannot be used to optimize network performance.

In conclusion, the MLB policy formulated in the conventional technology has many problems. Therefore, a new load balancing policy determining method needs to be urgently proposed, so that an accurate MLB policy of high robustness can be formulated.

SUMMARY

A load balancing policy determining method and apparatus are provided, so that a mobility load balancing MLB policy of high robustness can be accurately formulated for a network, to optimize network performance.

According to a first aspect, an embodiment of this application provides a load balancing policy determining method. The method may be performed by a first prediction module, where the first prediction module may be located inside a first base station, or may be independently located outside the first base station, or may be located in a CU of the first base station; or may be performed by a chip corresponding to the first prediction module. This is not specifically limited in this application. The following steps are included. The first prediction module obtains first information of at least one first base station, where the first information is used to assist the first prediction module in performing load prediction on the at least one first base station, the first information of one first base station includes information about a first cell and information about a first terminal device located in the first cell, and the first cell is managed by the first base station. The first prediction module separately determines load prediction information of the at least one first base station based on the first information of the at least one first base station, where the load prediction information of each first base station includes load prediction information of a corresponding first cell and/or load prediction information of a corresponding first terminal device. The first prediction module obtains load prediction information of at least one second base station from a second prediction module, where the load prediction information of each second base station includes load prediction information of a corresponding second cell and/or load prediction information of a second terminal device located in the second cell, and the second cell is managed by the second base station. The first prediction module determines a load policy of the at least one first base station based on the load prediction information of the at least one first base station and the load prediction information of the at least one second base station.

In this design, the first prediction module obtains the first information of the at least one first base station, and the first information may be used as input information for the first prediction module to perform the load prediction on the first base station, so that the first prediction module may determine the load prediction information for each first base station based on the first information of each first base station. The first prediction module may further obtain the load prediction information of the at least one second base station by using, but not limited to, the second prediction module, so that the first prediction module may comprehensively formulate an appropriate load policy for each first base station in advance with reference to the load prediction information of the at least one first base station and the load prediction information of the at least one second base station. Therefore, in the method, the prediction module can accurately predict comprehensive load information of the base station, so that a load policy of high accuracy and robustness can be formulated in advance for the base station, and the base station executes the load policy, to improve network performance.

It should be understood that, if the first prediction module is inside one first base station, the first prediction module may directly obtain, through an internal interface, first information of a first base station in which the first prediction module is located, and another first base station may send the first information to the first prediction module through wireless communication. In addition, the first prediction module may directly obtain the load prediction information of the at least one second base station through a communication interface with the second prediction module. The second prediction module sends the load prediction information of the at least one second base station to a specified base station or core network, and then the first prediction module may obtain the load prediction information of the at least one second base station via the base station or the core network. Therefore, a manner in which the first prediction module obtains the load prediction information of the at least one second base station is not specifically limited in this application.

In a possible design, before the first prediction module obtains the first information of the at least one first base station, the method further includes: The first prediction module sends first time information and first input information to the second prediction module, and receives second time information and second input information from the second prediction module. The first time information includes a load prediction periodicity of the first prediction module and an information exchange periodicity, the first input information indicates the second prediction module to provide the load prediction information of the at least one second base station for the first prediction module, and the load prediction information of the at least one second base station is used to assist the first prediction module in performing comprehensive load prediction on the at least one first base station; the second time information includes a load prediction periodicity of the second prediction module and the information exchange periodicity, the second input information indicates the first prediction module to provide the load prediction information of the at least one first base station for the second prediction module, and the load prediction information of the at least one first base station is used to assist the second prediction module in performing comprehensive load prediction on the at least one second base station; and the information exchange periodicity is a periodicity of information exchange between the first prediction module and the second prediction module.

In this design, before obtaining the first information of the at least one first base station, the first prediction module further needs to exchange time information and predicted input information with the second prediction module to obtain the first information of the at least one first base station. Subsequently, the first prediction module may accurately obtain required information from the second prediction module based on the exchange time information and predicted input information.

In a possible design, the method further includes: The first prediction module obtains load fluctuation indication information of the at least one second base station, and sends load fluctuation indication information of the at least one first base station, where the load fluctuation indication information indicates the first base station or the second base station to send load fluctuation information when a load fluctuation exceeds a specified threshold in the load prediction periodicity.

In this design, before obtaining the first information of the at least one first base station, the first prediction module further needs to exchange the load fluctuation indication information with a neighboring base station. Therefore, if the first prediction module predicts that load of the first base station fluctuates greatly in a next specified time period or at a next specified time point, the first prediction module may send the load fluctuation indication information to notify the neighboring base station or a neighboring prediction module, to formulate a load policy in advance based on the load fluctuation indication information, and to implement network load balancing.

In a possible design, when the first prediction module obtains the load prediction information of the at least one second base station, the method further includes: The first prediction module sends the load prediction information of the at least one first base station in the information exchange periodicity based on the second input information, where the load prediction information of each first base station is load prediction information indicated by the second input information.

In this design, the first prediction module may accurately determine, in the information exchange periodicity based on the second input information obtained from the second prediction module, information that needs to be provided by a neighboring base station when the second prediction module performs the load prediction on the at least one second base station, and then send the information to the second prediction module, so that the second prediction module may comprehensively predict load of the at least one second base station, to ensure accuracy of formulating a load policy.

In a possible design, when the first prediction module obtains the load prediction information of the at least one second base station, the method includes: The first prediction module obtains the load prediction information of the at least one second base station in the information exchange periodicity based on the first input information, where the load prediction information of each second base station is load prediction information indicated by the first input information.

In this design, the first prediction module may accurately obtain required load prediction information of a neighboring base station from the second prediction module in the information exchange periodicity based on the first input information, so that the first prediction module may comprehensively predict load of the at least one first base station, to ensure accuracy of formulating the load policy.

In a possible design, that the first prediction module separately determines load prediction information of the at least one first base station based on the first information of the at least one first base station includes: The first prediction module determines, based on the first information of each first base station, the information about the first cell managed by each first base station, and the first prediction module determines the load prediction information of the first cell of each first base station based on the information about the first cell of each first base station and an established load prediction model of the first cell; or the first prediction module determines the information about the first terminal device of each first base station based on the first information of each first base station, and the first prediction module determines the load prediction information of the first terminal device of each first base station based on the information about the first terminal device of each first base station and an established load prediction model of the first terminal device.

In this design, the first prediction module may determine the load prediction information of the cell of each first base station based on the obtained first information, and use the load prediction information of the cell as the load prediction information of each first base station; or the first prediction module may determine the load prediction information of the terminal device of each first base station based on the obtained first information, and use the load prediction information of the terminal device as the load prediction information of each first base station.

In a possible design, that the first prediction module determines a load policy of the at least one first base station based on the load prediction information of the at least one first base station and the load prediction information of the at least one second base station includes:

The first prediction module determines comprehensive load prediction information of the first prediction module based on the load prediction information of the at least one first base station and the load prediction information of the at least one second base station. The first prediction module obtains comprehensive load prediction information of the second prediction module, and sends the comprehensive load prediction information of the first prediction module, where the comprehensive load prediction information of the second prediction module is obtained by the second prediction module based on the load prediction information of the at least one first base station and the load prediction information of the at least one second base station. The first prediction module determines a load policy of the first prediction module based on the comprehensive load prediction information of the first prediction module and the comprehensive load prediction information of the second prediction module.

In this design, the first prediction module comprehensively determines the load prediction information of each first base station based on the load prediction information of the at least one first base station and the load prediction information of the at least one second base station, and the first prediction module further formulates the load policy for each first base station with reference to the comprehensive load prediction information of each first base station and the comprehensive load prediction information of each second base station. Therefore, in this method, the first prediction module can formulate the load policy for each first base station in advance, and reliability of the load policy for each base station is ensured.

It should be understood that, in the solution of this application, the first prediction module may determine the load policy for each first base station based on the comprehensive load prediction information of the at least one first base station and the comprehensive load prediction information of the at least one second base station, or the first prediction module may separately deliver the comprehensive load prediction information of the at least one first base station and the comprehensive load prediction information of the at least one second base station to each first base station, and the first base station determines an appropriate load policy. This is not specifically limited in this application.

In a possible design, that the first prediction module determines comprehensive load prediction information of the first prediction module based on the load prediction information of the at least one first base station and the load prediction information of the at least one second base station includes: The first prediction module determines local load prediction information of the at least one first base station based on the load prediction information of the at least one first base station, and the first prediction module determines flowing-out load prediction information of the at least one second base station based on the load prediction information of the at least one second base station. The first prediction module determines, from the flowing-out load prediction information of the at least one second base station, load prediction information of load that flows to the at least one first base station. The first prediction module determines the comprehensive load prediction information of the first prediction module based on the local load prediction information of the at least one first base station and the load prediction information of the load that flows to the at least one first base station.

In this design, when predicting load of each first base station, the first prediction module needs to consider local load information and flowing-out load information of each first base station, and load information of load that flows from a neighboring base station, to comprehensively predict load information of each first base station, and to ensure accuracy of the load prediction information of each first base station.

In a possible design, the method further includes: The first prediction module obtains a load policy of the second prediction module, and sends the load policy of the first prediction module. The first prediction module determines a final load policy based on the load policy of the first prediction module and the load policy of the second prediction module. The first prediction module separately sends the final load policy to the at least one first base station.

In this design, after determining the load policy for each first base station, the first prediction module may further exchange the load policy with the second prediction module, to finally formulate a load policy of higher reliability.

In a possible design, the first prediction module is located in any one of the at least one first base station, or the first prediction module is independent of the at least one first base station; and the second prediction module is located in any one of the at least one second base station, or the second prediction module is independent of the at least one second base station.

In this design, the first prediction module may be flexibly disposed inside the base station, or outside the base station; or in a CU-DU architecture, the first detection module is disposed in a CU, to implement load prediction and load policy inference.

According to a second aspect, an embodiment of this application provides a load balancing policy determining method. The method may be performed by a second prediction module, where the second prediction module may be located inside a second base station, or may be independently located outside the second base station, or may be located in a CU of the second base station, or may be performed by a chip corresponding to the second prediction module. This is not specifically limited in this application. The following steps are included. The second prediction module obtains second information of at least one second base station, where the second information is used to assist the second prediction module in performing load prediction on the at least one second base station, the second information of one second base station includes information about a second cell and information about a second terminal device located in the second cell, and the second cell is managed by the second base station. The second prediction module separately determines load prediction information of the at least one second base station based on the second information of the at least one second base station, where the load prediction information of each second base station includes load prediction information of a corresponding second cell and/or load prediction information of a corresponding second terminal device. The second prediction module obtains load prediction information of at least one first base station, where the load prediction information of each first base station includes load prediction information of a corresponding first cell and/or load prediction information of a first terminal device located in the first cell, and the first cell is managed by the first base station. The second prediction module determines a load policy of the at least one second base station based on the load prediction information of the at least one second base station and the load prediction information of the at least one first base station.

In a possible design, before the second prediction module obtains the second information of the at least one second base station, the method further includes: The second prediction module sends second time information and second input information to a first prediction module, and receives first time information and the second input information from the first prediction module. The first time information includes a load prediction periodicity of the first prediction module and an information exchange periodicity, first input information indicates the second prediction module to provide the load prediction information of the at least one second base station for the first prediction module, and the load prediction information of the at least one second base station is used to assist the first prediction module in performing comprehensive load prediction on the at least one first base station; the second time information includes a load prediction periodicity of the second prediction module and the information exchange periodicity, the second input information indicates the first prediction module to provide the load prediction information of the at least one first base station for the second prediction module, and the load prediction information of the at least one first base station is used to assist the second prediction module in performing comprehensive load prediction on the at least one second base station; and the information exchange periodicity is a periodicity of information exchange between the first prediction module and the second prediction module.

In a possible design, the method further includes: The second prediction module obtains load fluctuation indication information of the at least one first base station, and sends load fluctuation indication information of the at least one second base station, where the load fluctuation indication information indicates the first base station or the second base station to send load fluctuation information when a load fluctuation exceeds a specified threshold in the load prediction periodicity.

In a possible design, when the second prediction module obtains the load prediction information of the at least one first base station, the method further includes: The second prediction module sends the load prediction information of the at least one second base station in the information exchange periodicity based on the first input information, where the load prediction information of each second base station is load prediction information indicated by the first input information.

In a possible design, when the second prediction module obtains the load prediction information of the at least one first base station, the method includes: The second prediction module obtains the load prediction information of the at least one first base station in the information exchange periodicity based on the second input information, where the load prediction information of each first base station is load prediction information indicated by the second input information.

In a possible design, that the second prediction module separately determines load prediction information of the at least one second base station based on first information of the at least one second base station includes: The second prediction module determines, based on the second information of each second base station, the information about the second cell managed by each second base station, and the second prediction module determines the load prediction information of the second cell of each second base station based on the information about the second cell of each second base station and an established load prediction model of the second cell; or the second prediction module determines the information about the second terminal device of each second base station based on the second information of each second base station, and the second prediction module determines the load prediction information of the second terminal device of each second base station based on the information about the second terminal device of each second base station and an established load prediction model of the second terminal device.

In a possible design, that the second prediction module determines a load policy of the at least one second base station based on the load prediction information of the at least one second base station and the load prediction information of the at least one first base station includes: The second prediction module determines comprehensive load prediction information of the second prediction module based on the load prediction information of the at least one second base station and the load prediction information of the at least one first base station. The second prediction module obtains comprehensive load prediction information of a first prediction module, and sends the comprehensive load prediction information of the second prediction module, where the comprehensive load prediction information of the first prediction module is obtained by the first prediction module based on the load prediction information of the at least one first base station and the load prediction information of the at least one second base station. The second prediction module determines a load policy of the second prediction module based on the comprehensive load prediction information of the first prediction module and the comprehensive load prediction information of the second prediction module.

In a possible design, that the second prediction module determines comprehensive load prediction information of the second prediction module based on the load prediction information of the at least one second base station and the load prediction information of the at least one first base station includes: The second prediction module determines local load prediction information of the at least one second base station based on the load prediction information of the at least one second base station, and the second prediction module determines flowing-out load prediction information of the at least one first base station based on the load prediction information of the at least one first base station. The second prediction module determines, from the flowing-out load prediction information of the at least one first base station, load prediction information of load that flows to the at least one second base station. The second prediction module determines the comprehensive load prediction information of the second prediction module based on the local load prediction information of the at least one second base station and the load prediction information of the load that flows to the at least one second base station.

In a possible design, the method further includes: The second prediction module obtains a load policy of the first prediction module, and sends the load policy of the second prediction module. The second prediction module determines a final load policy based on the load policy of the first prediction module and the load policy of the second prediction module. The second prediction module separately sends the final load policy to the at least one second base station.

In a possible design, the second prediction module is located in any one of the at least one second base station, or the second prediction module is independent of the at least one second base station; and the first prediction module is located in any one of the at least one first base station, or the first prediction module is independent of the at least one first base station.

According to a third aspect, an embodiment of this application provides a load balancing policy determining apparatus. The apparatus may be used in a first prediction module, and has a function of implementing the method in any one of the first aspect or the possible designs of the first aspect. The function may be implemented by hardware, or may be implemented by hardware executing corresponding software. The hardware or the software includes one or more units corresponding to the function, for example, includes a communication unit and a processing unit.

According to a fourth aspect, an embodiment of this application provides a load balancing policy determining apparatus. The apparatus may be used in a second prediction module, and has a function of implementing the method in any one of the second aspect or the possible designs of the second aspect. The function may be implemented by hardware, or may be implemented by hardware executing corresponding software. The hardware or the software includes one or more units corresponding to the function, for example, includes a communication unit and a processing unit.

According to a fifth aspect, this application further provides a load balancing policy determining apparatus. The apparatus may be used in a first prediction module, and has a function of implementing the method in any one of the first aspect or the possible designs of the first aspect. The apparatus may include a transceiver (or a communication interface) and a processor.

According to a sixth aspect, this application further provides a load balancing policy determining apparatus. The apparatus may be used in a second prediction module, and has a function of implementing the method in any one of the second aspect or the possible designs of the second aspect. The apparatus may include a transceiver (or a communication interface) and a processor.

According to a seventh aspect, an embodiment of this application further provides a computer storage medium. The storage medium stores a software program, and when the software program is read and executed by one or more processors, the method provided in any one of the first aspect or the designs of the first aspect may be implemented, or the method provided in any one of the second aspect or the designs of the second aspect may be implemented.

According to an eighth aspect, an embodiment of this application further provides a computer program product including instructions. When the computer program product runs on a computer, the method provided in any one of the first aspect or the designs of the first aspect is performed, or the method provided in any one of the second aspect or the designs of the second aspect is performed.

According to a ninth aspect, an embodiment of this application further provides a chip system. The chip system includes a processor, configured to support a first prediction module in implementing a function in the first aspect, or support a second prediction module in implementing a function in the second aspect.

In a possible design, the chip system further includes a memory. The memory is configured to store and load program instructions and data that are necessary for an apparatus to execute. The chip system may include a chip, or may include a chip and another discrete component.

For technical effects that can be achieved in any one of the second aspect or the designs of the second aspect, technical effects that can be achieved in any one of the third aspect or the designs of the third aspect, and technical effects that can be achieved in any one of the fourth aspect or the designs of the fourth aspect, refer to the descriptions of the technical effects that can be achieved in any one of the first aspect or the designs of the first aspect. Details are not described herein again.

DETAILED DESCRIPTION OF ILLUSTRATIVE EMBODIMENTS

Embodiments of this application provide a load balancing policy determining method and apparatus. The method and the apparatus are based on a same technical concept or similar technical concepts. Because a problem-resolving principle of the method is similar to that of the apparatus, mutual reference may be made to implementations of the apparatus and the method. Repeated parts are not described in detail.

Figure 1:
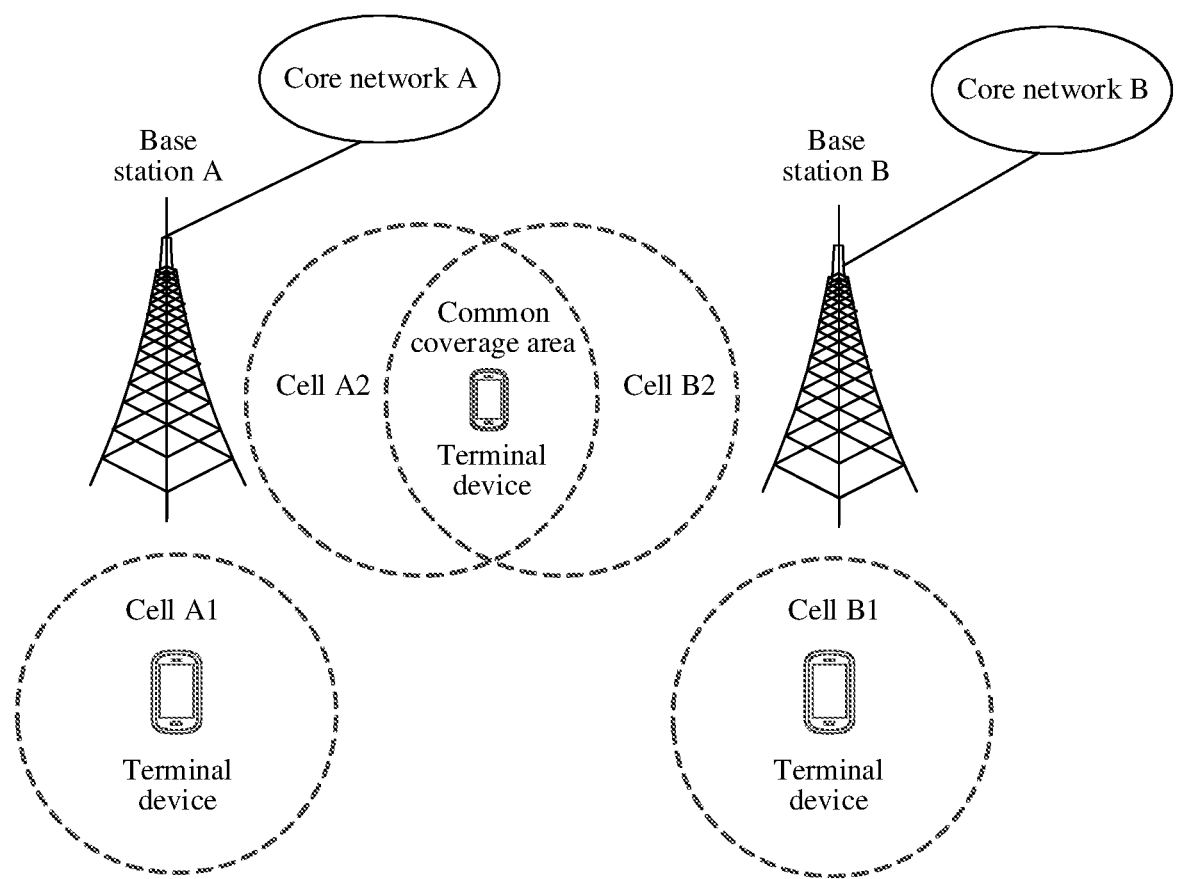
FIG. 1 shows a 5G mobile communication system to which a load balancing policy determining method is applicable according to an embodiment of this application.

FIG. 1 shows a 5G mobile communication system to which a load balancing policy determining method is applicable according to this application. As shown in FIG. 1, the 5G mobile communication system (which may be referred to as a 5G network for short below) includes an access network, for example, a base station A and a base station B, and a core network, for example, a core network A and a core network B. An interface between the base station A and the core network A, and an interface between the base station B and the core network B are referred to as an Xn interface. The base station A may communicate with the core network A through the Xn interface, and the base station B may also communicate with the core network B through the Xn interface. The base station A and the base station B may also be referred to as a gNB, and the 5G core network may also be referred to as a new radio core (NR core).

The 5G base station A may manage a plurality of cells (for example, a cell A1 and a cell A2), and the 5G base station B may manage a plurality of cells (for example, a cell B1 and a cell B2). In addition, there may be one or more terminal devices in each cell managed by the base station A and the base station B, and the terminal devices may access a corresponding network by accessing the cell, to implement wireless communication. However, as a quantity of terminal devices that access a cell managed by a base station (for example, the base station A) increases, and a service volume increases, load of a single base station and cell is heavy, causing low network performance. In this case, there may be a cell that is managed by another base station and that has low load because of a small quantity of terminal devices that access the cell or a small service volume.

Therefore, for the foregoing problem, a mobility load balancing technology is usually used, so that different base stations in a same system or different systems exchange respective resource usage, to optimize network mobility parameter configuration and balance load of the base station or the cell based on the resource usage, and therefore improve network performance.

In a conventional NR MLB technology, the base station may formulate different MLB policies based on current resource statuses of the base station and a neighboring base station. However, if network load of each base station fluctuates, reported resource usage of the base station also fluctuates. In this case, the MLB policy formulated only based on recently reported resource usage needs to be updated continuously, and a frequent change of a base station configuration and frequent reconfiguration of a UE are caused. Consequently, robustness of the MLB policy formulated in the conventional technology is poor. In addition, formulating the MLB policy in the conventional technology limits improvement of network performance. For example, a periodicity of reporting resource usage of the base station is T, and resource usage is reported once at a moment t. However, a current MLB policy formulated at the moment t is not applicable to a scenario in which network load fluctuates between the moment t and a moment t+T.

In conclusion, the MLB policy formulated in the conventional technology has many problems. Therefore, a new load balancing policy determining method needs to be urgently proposed, so that an accurate MLB policy of high robustness can be formulated.

Therefore, this application provides a load balancing policy determining method. An artificial intelligence AI technology is combined with the conventional mobility load balancing MLB technology, that is, network running load can be accurately predicted using the AI technology, and an accurate MLB policy of high robustness can be inferred based on predicted comprehensive load information, to balance network load, and therefore better improve network performance.

It should be noted that the solutions of this application are not only applicable to the foregoing 5G mobile communication system, but also applicable to but not limited to a long term evolution (LTE) communication system and various future evolved wireless communication systems.

Figure 2A:
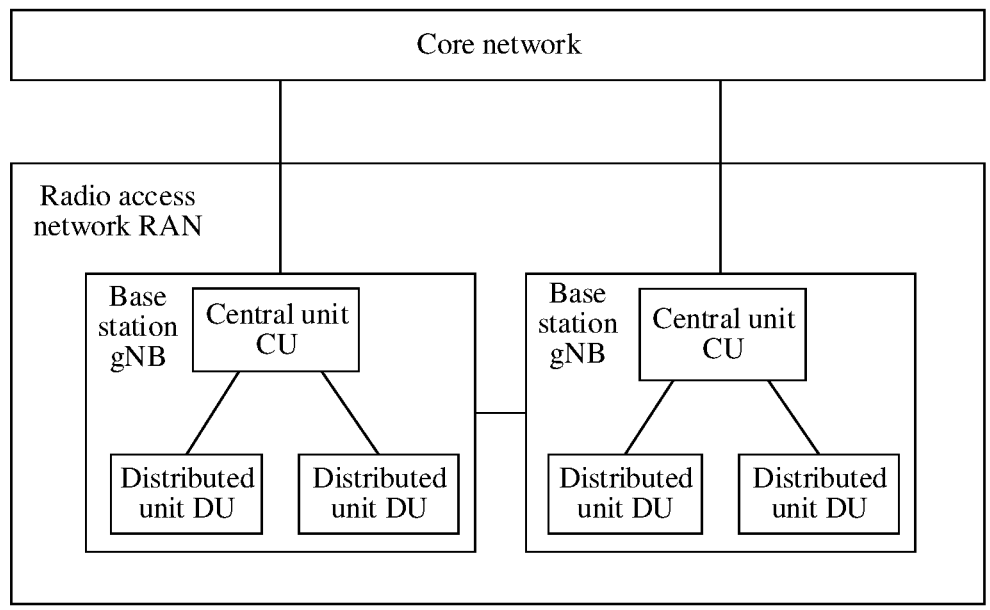
FIG. 2A is a diagram of a CU-DU architecture to which a load balancing policy determining method is applicable according to an embodiment of this application.

A network device in embodiments of this application may be a base station or the like in an access network RAN. As shown in FIG. 2A, the base station may be a central unit (CU) and a distributed unit (DU) split architecture. It may be understood that the base station is divided into the CU and the DU by logical functions. The CU and the DU may be physically separated or deployed together. A plurality of DUs may share one CU, or one DU may be connected to a plurality of CUs (not shown in FIG. 2A). The CU and the DU may be connected through an interface, for example, an F1 interface. The CU and the DU may be obtained through division based on protocol layers of a wireless network. For example, a possible division manner is that the CU is configured to perform functions of a radio resource control (RRC) layer, a service data adaptation protocol (SDAP) layer, and a packet data convergence protocol (PDCP) layer, and the DU is configured to perform functions of a radio link control (radio link control, RLC) layer, a media access control (MAC) layer, a physical (physical) layer, and the like. It may be understood that division into processing functions of the CU and the DU based on the protocol layers is merely an example, and there may be other division. For example, the CU or the DU may have functions of more protocol layers through division. For example, the CU or the DU may alternatively have some processing functions of the protocol layers through division. In a design, some functions of the RLC layer and functions of a protocol layer above the RLC layer are distributed in the CU, and remaining functions of the RLC layer and functions of a protocol layer below the RLC layer are distributed in the DU. In another design, functions of the CU or the DU may alternatively be obtained through division based on a service type or another system requirement. For example, division is performed based on a delay, a function whose processing time needs to satisfy a delay requirement is distributed in the DU, and a function whose processing time does not need to satisfy the delay requirement is distributed in the CU. In another design, the CU may alternatively have one or more functions of the core network. One or more CUs may be disposed in a centralized manner or a split manner. For example, the CUs may be disposed on a network side for ease of centralized management. The DU may have a plurality of radio frequency functions, or the radio frequency functions may be disposed remotely.

Functions of the CU may be implemented by one entity, or may be implemented by different entities. For example, the functions of the CU may be divided, for example, separated into a control plane (CP) and a user plane (UP), namely, the control plane (CU-CP) of the CU and the user plane (CU-UP) of the CU. For example, the CU-CP and the CU-UP may be implemented by different functional entities and are connected through an E1 interface. The CU-CP and the CU-UP may be coupled to the DU to jointly implement a function of the base station.

A terminal device in embodiments of this application may be a wireless terminal or a wired terminal. The wireless terminal may be a device that provides voice and/or data connectivity for a user, a handheld device having a radio connection function, or another processing device connected to a radio modem. The wireless terminal may communicate with one or more core networks via a radio access network (RAN). The wireless terminal may be a mobile terminal, such as a mobile phone (also referred to as a "cellular" phone) and a computer having a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit (SU), a subscriber station (SS), a mobile station (MB), a mobile (Mobile) console, a remote station (RS), an access point (AP), a remote terminal (RT), an access terminal (AT), a user terminal (UT), a user agent (UA), a user device (UD), or user equipment (UE).

It should be understood that, in an existing communication mechanism (for example, in LTE and NR), mobility load balancing (MLB) may be: Resource usage is exchanged between base stations, to optimize network mobility parameter configuration. Exchanged content includes transport layer resources, hardware usage, radio load, an overall resource status, and the like. In addition, the function (exchange function) exists between interfaces of a network device, for example, an NG interface (between an NG-RAN base station and a core network), an Si interface (between an LTE base station and a core network), an Xn interface (between NR base stations), an X2 interface (between LTE base stations), an F1 interface (between a CU and a DU), and an E1 interface (between a CU-CP and a CU-UP).

The following uses the Xn interface as an example to describe basic content of the mobility load balancing MLB.

Refer to MLB in TS 36.423 and TS 38.423. The following three procedures may be specifically included, where the second procedure and the third procedure are different phases of a same event.

Figure 2B:
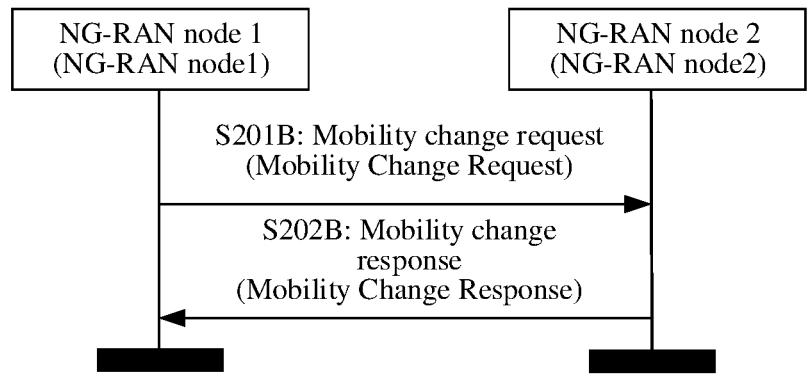
FIG. 2B is a first schematic flowchart of mobility load balancing in the conventional technology.

The first procedure: When a mobility parameter changes and a mobility parameter is negotiated with a neighboring station (Mobility Settings Change), refer to FIG. 2B. The specific procedure includes the following steps.

S201B: An NG-RAN node 1 sends a mobility change request (Mobility Change Request) to an NG-RAN node 2.

S202B: The NG-RAN node 2 returns a mobility change response (Mobility Change Response) to the NG-RAN node 1, where the mobility change response indicates that a mobility parameter of the NG-RAN node 2 is successfully changed or fails to be changed (Acknowledge/failure).

Figure 2C:
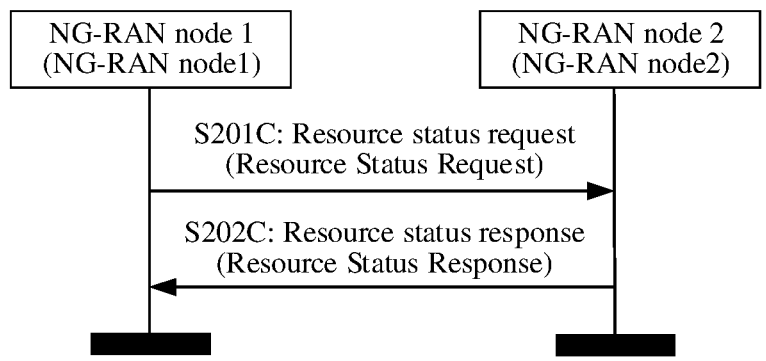
FIG. 2C is a second schematic flowchart of mobility load balancing in the conventional technology.

The second procedure: When a resource status report is initialized and resource usage is exchanged with the neighboring station (Resource Status Reporting Initiation), refer to FIG. 2C. The specific procedure includes the following steps.

S201C: The NG-RAN node 1 sends a resource status request (Resource Status Request) to the NG-RAN node 2.

S202C: The NG-RAN node 2 returns a resource status response (Resource Status Response) to the NG-RAN node 1, and determines a resource status of the NG-RAN node 1 based on the resource status response.

Figure 2D:
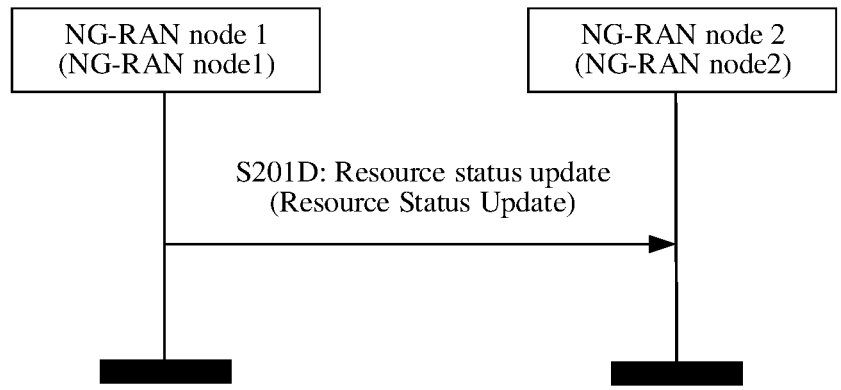
FIG. 2D is a third schematic flowchart of mobility load balancing in the conventional technology.

The third procedure is resource status reporting (Resource Status Reporting). Refer to a resource status report procedure shown in FIG. 2D. The specific procedure includes the following steps.

S201D: Based on step S202C in FIG. 2C, if the NG-RAN node 1 receives a resource status response result (if the resource status response result is Acknowledge), the NG-RAN node 1 sends a resource status update (Resource Status Update) message to the NG-RAN node 2, to update a resource status of the NG-RAN node 2.

The following describes the foregoing message and information element in detail.

Mobility parameter change (Mobility Settings Change): The process may be caused by a plurality of reasons. One of the reasons is that after adjacent base stations exchange resource usage, a base station determines to let a neighboring base station change a handover trigger threshold (Handover Trigger Change). If a base station 1 determines that a base station 2 is idle, the base station 1 sends a mobility change request (Mobility Change Request) message to let the base station 2 increase the handover trigger threshold, so that more UEs can be connected to the base station 2 instead of being handed over to the base station 1. If the base station 2 accepts the mobility change request of the base station 1, the base station 2 sends acknowledge (Acknowledge) information; and if the base station 2 does not accept the mobility change request of the base station 1, the base station 2 sends failure (Failure) information, and includes a reason and an achievable adjustment range in the failure information, (where the base station 1 may initiate a next request after receiving the adjustment range).

It should be noted that the mobility parameter change (Mobility Settings Change) procedure is for two adjacent cells, and therefore is adjustment of per cell of the adjacent cells, where the handover trigger threshold is also for a specific cell to another specific neighboring cell.

Resource status report use (Resource Status Reporting Initiation): The base station 1 may send a resource status request message to the base station 2 if the base station 1 expects to learn of resource usage of the base station 2, so that the base station 2 may start measurement/stop measurement/add (some cells) for measurement on various resources (carried in Report Characteristics) based on the resource status request message.

If the base station 2 can successfully measure all required resources, the base station 2 returns a response message. If there is one type of resource on which the base station 2 cannot start measurement, the base station 2 returns a failure message.

It should be noted that a granularity of the procedure is diversified, and the various resources may be of per node/cell/SSB/Slice.

The node represents a base station, the cell represents a cell, the SSB represents a beam, and the Slice represents a slice (which may be used to ensure a part of network resources of a communication service).

Resource status reporting (Resource Status Reporting): After measuring the various resources required by the base station 1, the base station 2 sends a measurement report to the base station 1, and a sending periodicity is determined based on Reporting Periodicity in the request message.

The base station 2 sends a reported resource type/characteristic to the base station 1 based on the resource status request message. Specifically, the reported resource type/characteristic may include but is not limited to at least one of the following: (1) an air interface resource (Physical Resource Block or Radio resource status); (2) uplink and downlink GBR/non-GBR usage percentages per cell/SSB; (3) a transport layer resource (Transparent Network Layer Capacity) per cell/node is FFS; (4) provided uplink and downlink TNLs; (5) uplink and downlink available TNL percentages; (6) overall available resources (Composite Available Capacity) per cell/SSB, divided into an uplink resource and a downlink resources, and the resources are combined into a CAC group; (7) a cell capacity level; (8) an available capacity percentage; (9) an available percentage of a total capacity of a cell; (10) an available percentage of a capacity of each SSB; (11) a hardware resource (Hardware Capacity Indicator) per cell/node; (12) uplink and downlink hardware available capacities; (13) a slice available capacity (Slice Available Capacity) per slice; (11) an available capacity of each slice; (12) a number of active UEs (Number of Active UE) per cell; (13) a number of RRC connections (RRC Connections) per cell; (14) a number of RRC connections; (15) an available percentage of RRC connections; (16) load of different service types; (17) a service types of a cell; (18) a load size corresponding to each service type of a cell; (19) user movement track prediction; (20) a UE movement track or an RSRP/RSRQ change rule predicted by a base station; and (21) a historical UE movement track stored by a base station.

Figure 2E:
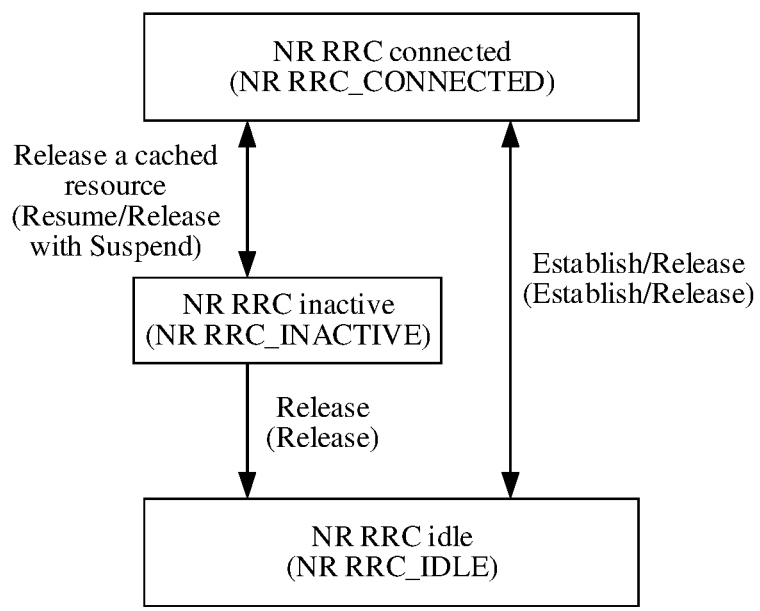
FIG. 2E is a schematic diagram of switching of three statuses of an RRC link according to an embodiment of this application.

Radio resource control (RRC) status: In NR, RRC statuses of the UE include RRC_CONNECTED (a connected status), RRC_INACTIVE (a deactivated status or a third status), and RRC_IDLE (an idle status). When the UE is in the RRC_CONNECTED status, links are established between the UE, a base station, and a core network; and when there is data arriving at the network, the data may be directly transmitted to the UE. When the UE is in the RRC_INACTIVE status, it indicates that links have been established between the UE, the base station, and the core network, but a link from the UE to the base station is released; and the base station stores context of the UE, and when there is data that needs to be transmitted, the base station can quickly resume the link although the like is released. When the UE is in the RRC_IDLE status, there is no link between the UE, the base station, and the network; and when there is data that needs to be transmitted, the links between the UE, the base station, and the core network need to be established. Specifically, for switching of the three statuses, refer to FIG. 2E.

It should be noted that at least one in embodiments of this application includes one or more, where a plurality of means two or more. In addition, it should be understood that, in descriptions of this application, terms such as "first" and "second" are merely used for distinguishing and description, but should not be understood as indicating or implying relative importance, or should not be understood as indicating or implying a sequence.

Terms used in the following embodiments are merely intended to describe specific embodiments, but are not intended to limit this application. Terms "a", "the", "the foregoing", "this", and "the one" of singular forms used in this specification and the appended claims of this application are also intended to include forms such as "one or more", unless otherwise specified in the context clearly. It should be further understood that, in embodiments of this application, "one or more" means one or more than two (including two); and "and/or" describes an association relationship for describing associated objects and represents that three relationships may exist. For example, A and/or B may represent the following cases: Only A exists, both A and B exist, and only B exists. A and B each may be in a singular or plural form. The character "/" generally indicates an "or" relationship between the associated objects.

Reference to "one embodiment", "some embodiments", or the like described in this specification means that specific features, structures, or characteristics described with reference to the embodiments are included in one or more embodiments of this application. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have", and variants of the terms all mean "include but are not limited to", unless otherwise specifically emphasized in another manner.

It should be understood that both a "load policy" and a "load balancing policy" in embodiments of this application may be understood as a "mobility load balancing policy". The "mobility load balancing policy" in embodiments of this application is a rule, a system, a solution, or the like used to implement mobility load balancing.

In addition, "predicting load information" in embodiments of this application indicates to predict load information, and "load prediction information" indicates result information obtained by predicting the load information. The load information includes but is not limited to a service type, service distribution information, load fluctuation information, PDCCH CCE occupation information, and PRB occupation information.

Figure 3:
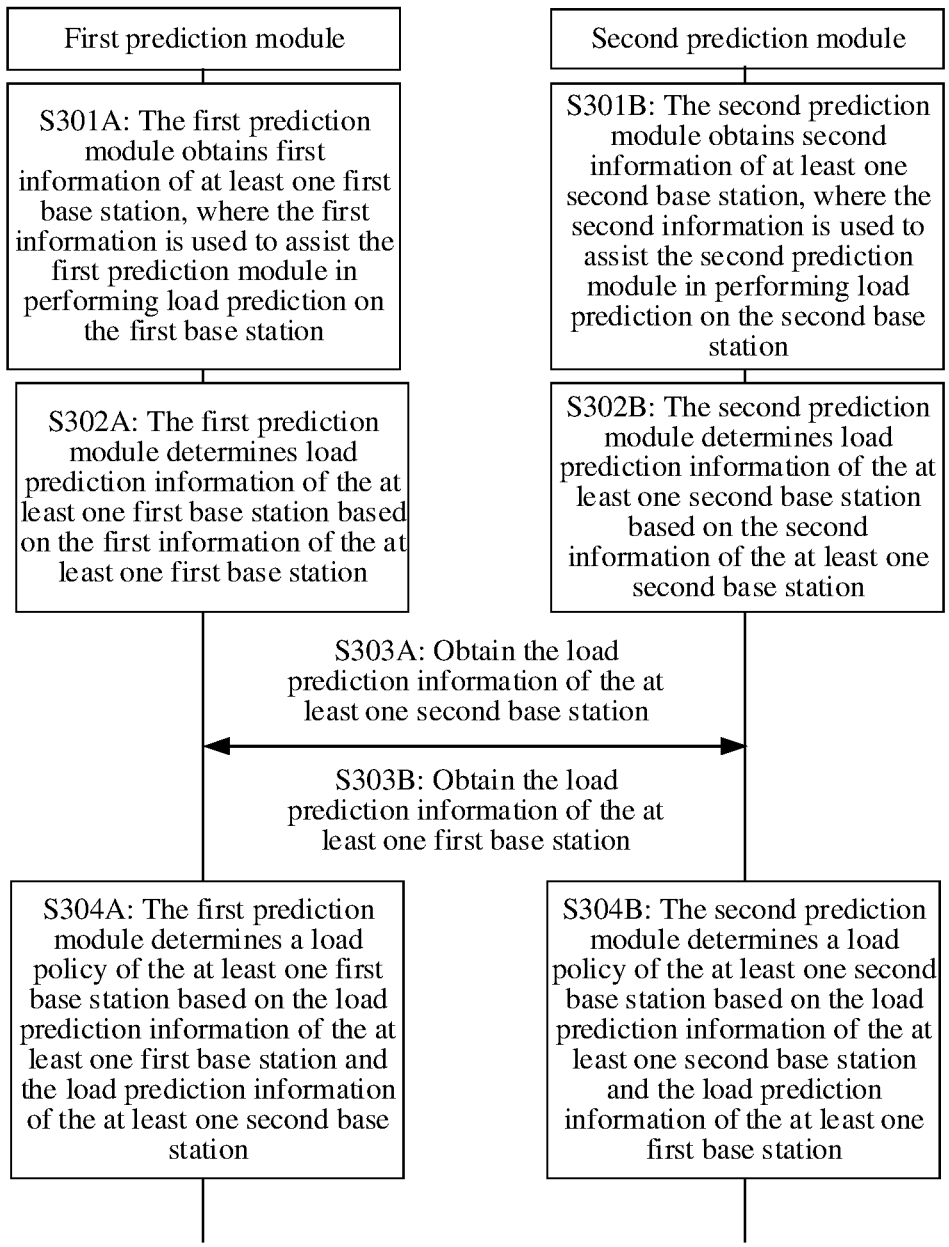
FIG. 3 is a schematic flowchart of a load balancing policy determining method according to an embodiment of this application.

An embodiment of this application provides a load balancing policy determining method. The method may be applicable to but is not limited to the 5G system architecture in FIG. 1. FIG. 3 is a flowchart of a first mobility load balancing determining method according to an embodiment of this application. Specifically, the method may be performed by a prediction module (for example, a first prediction module and a second prediction module), where the prediction module may be located inside a base station, or may be independently located outside the base station, or may be located in a CU; or may be performed by a chip corresponding to the prediction module. Therefore, a location of the prediction module and a specific form of the prediction module are not limited in this application. Specifically, the following steps may be included.

S301A: A first prediction module obtains first information of at least one first base station, where the first information is used to assist the first prediction module in performing load prediction on the at least one first base station.

It should be understood that the first prediction module has prediction and inference functions. For example, the first prediction module may be an artificial intelligence (AI) module. The first prediction module may be configured to be responsible for load prediction and MLB policy inference of the one or more first base stations. The first prediction module may be independent of all first base stations, or may be located inside one of the first base stations. Alternatively, in a CU-DU architecture, the first prediction module may be located in one of CUs, and is configured to be responsible for load prediction and MLB policy inference of one or more DUs. Therefore, a location of the first prediction module is not specifically limited in this application, and a specific form of the first prediction module is not limited.

Specifically, the first information that is of the at least one first base station and that is obtained by the first prediction module includes information about a first cell corresponding to the first base station and information about a first terminal device located in the first cell. For example, the first prediction module obtains first information of a first base station 1 and first information of a first base station 2, where the first information of the first base station 1 includes information about a first cell 1 managed by the first base station 1 and information about a terminal device in the cell, and the first information of the first base station 2 includes information about a first cell 2 managed by the first base station 2 and information about a terminal device in the cell.

For example, the first information may include but is not limited to at least one of information: an existing service and a historical service of a UE (for example, a current service type is a voice service, and a service data volume accounts for 80%), load prediction of a cell (for example, a current load prediction result of a cell managed by the base station is that a capacity upper limit of 80% is reached in next 5 minutes) and historical load distribution (for example, a load change of a cell in a past day), track prediction of a UE (for example, whether the UE is connected to a local cell or leaves the local cell in a next specified time period), a load capability of a base station (for example, maximum load of the base station meets a capacity of 1000 Mbit/s, and the like), and the like. In an MR-DC scenario, the first information may include a proportion of a duplication part in a service volume of the UE (for example, 50% of a service of the UE belongs to duplication transmission).

It should be understood that the cell and the base station also have a prediction function. Therefore, the load prediction of the cell and the track prediction of the UE may be obtained by the cell and the UE through prediction.

In an implementation, before the first prediction module obtains the first information of the at least one first base station, the method further includes:

The first prediction module sends first time information and first input information to the second prediction module, and receives second time information and second input information from the second prediction module.

The first time information includes but is not limited to a load prediction periodicity of the first prediction module and an information exchange periodicity, and the second time information includes a load prediction periodicity of the second prediction module and the information exchange periodicity. It should be understood that the information exchange periodicity may be a periodicity of information exchange between the first prediction module and the second prediction module, or may be a periodicity of information exchange between the first base station in which the first prediction module is located and the second base station in which the second prediction module is located.

It should be noted that the first prediction module and the second prediction module may directly communicate with each other by establishing an interface, or may communicate with each other via a base station, or may communicate with each other via a core network. A communication manner of the first prediction module and the second prediction module is not specifically limited in this application. In addition, the first prediction module and the second prediction module may exchange information based on the information exchange periodicity, or may exchange information based on event triggering. This is not specifically limited in this application.

The first input information indicates the second prediction module to provide the load prediction information of the at least one second base station for the first prediction module, and the load prediction information of the at least one second base station is used to assist the first prediction module to perform comprehensive load prediction on the at least one first base station. The second input information indicates the first prediction module to provide the load prediction information of the at least one first base station for the second prediction module, and the load prediction information of the at least one first base station is used to assist the second prediction module to perform comprehensive load prediction on the at least one second base station.

Optionally, before the first prediction module obtains the first information of the at least one first base station, the first prediction module further needs to obtain load fluctuation indication information of the at least one second base station, and send load fluctuation indication information of the at least one first base station, where the load fluctuation indication information indicates the base station to send load fluctuation information when a load fluctuation exceeds a specified threshold in the load prediction periodicity (or in another next specified time period or at a next specified time point). For example, if load of the first base station in the load prediction periodicity or in a next specified time period or at a next specified time point exceeds a specified threshold, the first base station may send the load fluctuation information to the second prediction module.

It should be noted that, if the first prediction module is independent of the first base station, before obtaining the first information of the at least one first base station, the first prediction module needs to separately send indication information to each first base station, to indicate to report the first information, where the indication information needs to include a reporting periodicity corresponding to reporting information by a corresponding first base station. When the first base station reports the first information based on the event triggering, the indication information separately sent by the first prediction module to each first base station may further include a trigger event corresponding to reporting information based on event triggering, for example, a gate and a threshold.

S301B: The second prediction module obtains second information of the at least one second base station, where the second information is used to assist the second prediction module in performing load prediction on the at least one second base station.

It should be understood that the second prediction module has prediction and inference functions. For example, the second prediction module may be an artificial intelligence AI module. The second prediction module may be configured to be responsible for load prediction and MLB policy inference of the one or more base stations. The second prediction module may be independent of all the base stations, or may be located inside one of the base stations. Alternatively, in a CU-DU architecture, the second prediction module may be located in one of CUs, and is configured to be responsible for load prediction and MLB policy inference of one or more DUs. Therefore, a location of the second prediction module is not specifically limited in this application, and a specific form of the second prediction module is not limited.

Specifically, the second information that is of the at least one second base station and that is obtained by the second prediction module includes information about a second cell and information about a second terminal device located in the second cell, where the second cell is managed by the second base station. For example, the second prediction module obtains second information of a second base station 1 and second information of a second base station 2, where the second information of the second base station 1 includes information about a second cell 1 managed by the second base station 1 and information about a terminal device in the cell, and the second information of the second base station 2 includes information about a second cell 2 managed by the second base station 2 and information about a terminal device in the cell.

In an implementation, before the second prediction module obtains the second information of the at least one second base station, the method further includes:

The second prediction module sends the second time information and the second input information to the first prediction module, and receives the first time information and the second input information from the first prediction module.

The first time information includes the load prediction periodicity of the first prediction module and the information exchange periodicity, the first input information indicates the second prediction module to provide the load prediction information of the at least one second base station for the first prediction module, and the load prediction information of the at least one second base station is used to assist the first prediction module in performing the comprehensive load prediction on the at least one first base station. The second time information includes the load prediction periodicity of the second prediction module and the information exchange periodicity, the second input information indicates the first prediction module to provide the load prediction information of the at least one first base station for the second prediction module, and the load prediction information of the at least one first base station is used to assist the second prediction module in performing the comprehensive load prediction on the at least one second base station.

In addition, before the second prediction module obtains the second information of the at least one second base station, the second prediction module further needs to obtain the load fluctuation indication information of the at least one first base station, and send the load fluctuation indication information of the at least one second base station, where the load fluctuation indication information indicates the first base station or the second base station to send the load fluctuation information when the load fluctuation exceeds the specified threshold in the load prediction periodicity.

It should be noted that, because the second prediction module and the first prediction module need to interact with each other, and the steps and content to be performed are the same, when step S301B is performed, reference may be specifically made to the foregoing step S301A, and details are not described herein again. In addition, step S301A and step S301B need to be performed independently at the same time.

S302A: The first prediction module determines the load prediction information of the at least one first base station based on the first information of the at least one first base station, where the load prediction information of each first base station includes load prediction information of the first cell and/or load prediction information of the first terminal device.

In an implementation, that the first prediction module determines the load prediction information of the at least one first base station based on the first information of the at least one first base station may be specifically implemented in the following but not limited to the following two manners.

First manner: The first prediction module has obtained the first information of the at least one first base station in the foregoing step S301A (that is, one first base station correspondingly reports one piece of first information), and then the first prediction module determines, from the first information of each first base station, the information about the first cell managed by each first base station. Further, the first prediction module determines the load prediction information of the first cell of each first base station based on the information about the first cell of each first base station and an established load prediction model of the first cell. After the load prediction information of the cell managed by each first base station is determined, the load prediction information of the cell managed by each first base station may be used as the load prediction information of the corresponding first base station.

For example, the first prediction module is configured to manage the first base station 1 and the first base station 2, and the first prediction module separately obtains the first information of the first base station 1 and the first information of the first base station 2, which are respectively first information 1 and first information 2.

The first prediction module determines, based on the first information 1, the information about the first cell 1 managed by the first base station 1. Further, the first prediction module obtains corresponding load prediction information (that is, output information of the load prediction module) of the first cell 1 of the first base station 1 based on the information about the first cell 1 and a load prediction model that is of the cell 1 and that is already established in the first prediction module (that is, the information about the first cell 1 is used as input information of the load prediction module).

At the same time, the first prediction module determines, based on the first information 2, the information about the first cell 2 managed by the first base station 2. Further, the first prediction module obtains corresponding load prediction information of the first cell 2 of the first base station 2 based on the information about the first cell 2 and a load prediction model that is of the cell 2 and that is already established in the first prediction module (that is, the information about the first cell 2 is used as the input information of the load prediction module).

It should be understood that, if the first base station 1 manages only the first cell 1, the load prediction information of the first cell 1 may be used as the load prediction information of the first base station 1. If the first base station 1 manages a plurality of first cells, total load prediction information of the plurality of first cells is used as the load prediction information of the first base station 1. Similarly, if the first base station 2 manages only the first cell 2, the load prediction information of the first cell 2 may be used as the load prediction information of the first base station 2. If the first base station 2 manages a plurality of first cells, total load prediction information of the plurality of first cells is used as the load prediction information of the first base station 2.

Second manner: The first prediction module has obtained the first information of the at least one first base station in step S301A (that is, one first base station correspondingly reports one piece of first information), and then the first prediction module determines the information about the first terminal device of each first base station from the first information of each first base station. Further, the first prediction module determines load prediction information of the first terminal device of each first base station based on the information about the first terminal device of each first base station and an established load prediction model of the first terminal device.

It should be noted that, in practice, the load prediction information of the first terminal device of each first base station may be determined by collecting statistics on the load prediction information of the first cell in which the first terminal device is located. Therefore, for the second manner, refer to the foregoing first manner, to obtain the load prediction information of the first terminal device of the first base station, and use the load prediction information of the first terminal device of each first base station as the load prediction information corresponding to the first base station. Details are not described herein again.

Figure 4:
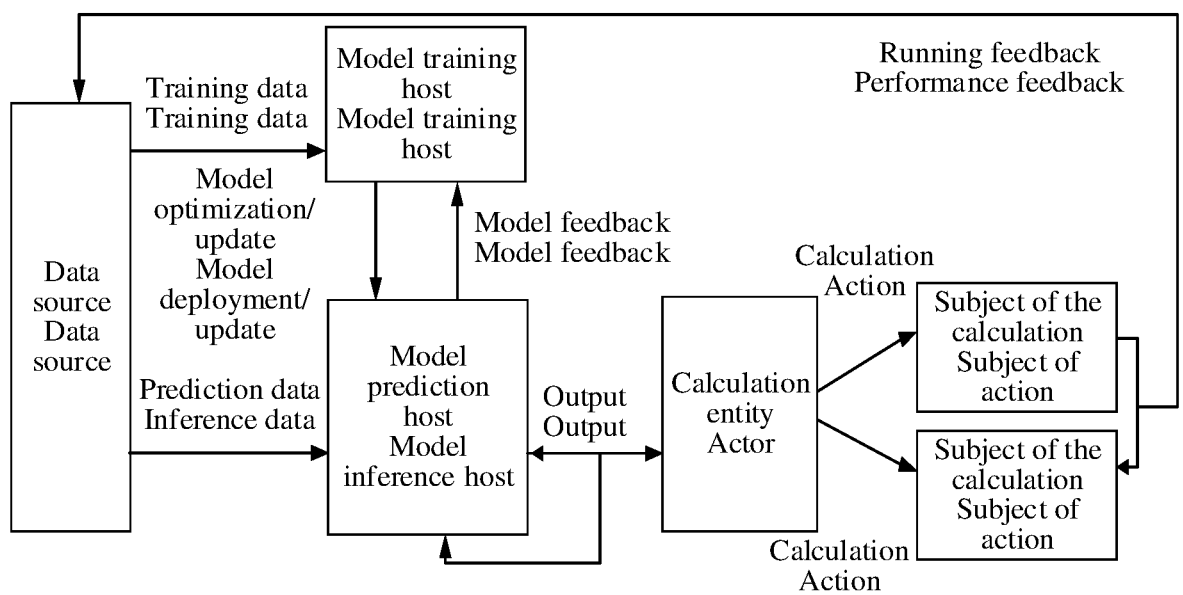
FIG. 4 is a schematic diagram of performing prediction and inference by an artificial intelligence AI module according to an embodiment of this application.

Refer to FIG. 4. Prediction and inference implemented by the first prediction module (an AI 1 module) are described.

As shown in FIG. 4, a data source (Data source) may be from a data input of a gNB, a gNB-CU, a gNB-DU, UE, or another management entity. Some data in the data source is used as training data, to obtain an AI model through training. Some data in the data source is used as inference data, to perform data analysis and inference. A model training host (Model training host) analyzes the training data (Training data) provided by the data source (Data source), to obtain an optimal AI model. Therefore, a model inference host (Model inference host) may use the AI model, to provide, based on the data provided by the data source, appropriate AI-based prediction network running, or guide network policy adjustment. The related policy adjustment is planned by an actor (Actor) and sent to a plurality of network entities. In addition, after a related policy is applied, specific network performance is input to a database again for storage.

S302B: The second prediction module determines the load prediction information of the at least one second base station based on the second information of the at least one second base station, where the load prediction information of each second base station includes load prediction information of a second cell and/or load prediction information of a second terminal device.

In an implementation, that the second prediction module determines the load prediction information of the at least one second base station based on the first information of the at least one second base station may be implemented in the following but not limited to the following two manners.

First manner: The second prediction module determines, based on the second information of each second base station, the information about the second cell managed by each second base station, and the second prediction module determines the load prediction information of the second cell of each second base station based on the information about the second cell of each second base station and an established load prediction model of the second cell.

Second manner: The second prediction module determines the information about the second terminal device of each second base station based on the second information of each second base station, and the second prediction module determines the load prediction information of the second terminal device of each second base station based on the information about the second terminal device of each second base station and an established load prediction model of the second terminal device.

It should be noted that, when step S302B is performed, specifically, reference may be made to step S302A, and details are not described herein again. Because the first prediction module interacts with the second prediction module, and the performed steps are correspondingly the same, step S302A and step S302B need to be performed independently at the same time.

S303A: The first prediction module obtains the load prediction information of the at least one second base station from the second prediction module, where the load prediction information of each second base station includes the load prediction information of the second cell and/or the load prediction information of the second terminal device located in the second cell, and the second cell is managed by the second base station.

In an implementation, when the first prediction module obtains the load prediction information of the at least one second base station, the method includes: The first prediction module obtains the load prediction information of the at least one second base station in the information exchange periodicity based on the first input information, where the load prediction information of each second base station is load prediction information indicated by the first input information.

For example, the first prediction module is responsible for two first base stations (that is, the first base station 1 and the first base station 2), and the second prediction module is responsible for two second base stations (that is, the second base station 1 and the second base station 2). Through the foregoing step S302B, the second prediction module has determined the load prediction information of the second base station 1 and the second base station 2. Therefore, the first prediction module may obtain the load prediction information of the second base station 1 and the second base station 2 (that is, load prediction information of each cell of the second base station 1 and load prediction information of each cell of the second base station 2) from the second prediction module in the information exchange periodicity based on the first input information (for example, when the second prediction module performs load prediction and MLB inference on the second base station, the second base station 1 and the second base station 2 need to provide load of each cell).

In an implementation, when the first prediction module obtains the load prediction information of the at least one second base station, the method further includes: The first prediction module sends the load prediction information of the at least one first base station in the information exchange periodicity based on the second input information, where the load prediction information of each first base station is load prediction information indicated by the second input information.

For example, the first prediction module is responsible for two first base stations (that is, the first base station 1 and the first base station 2), and the second prediction module is responsible for two second base stations (that is, the second base station 1 and the second base station 2). Through the foregoing step S302A, the first prediction module has determined the load prediction information of the first base station 1 and the second base station 2. Therefore, the first prediction module may send the load prediction information of the first base station 1 and the first base station 2 (that is, load prediction information of each cell of the first base station 1 and load prediction information of each cell of the first base station 2) to the second prediction module in the information exchange periodicity based on the second input information (for example, when the second prediction module performs load prediction and MLB inference on the second base station, the first base station 1 and the first base station 2 need to provide load of each cell).

S303B: The second prediction module obtains the load prediction information of the at least one first base station, where the load prediction information of each first base station includes the load prediction information of the first cell and/or the load prediction information of the first terminal device located in the first cell, and the first cell is managed by the first base station.

It should be noted that the foregoing step S303A and step S303B are represented as a process in which the first prediction module and the second prediction module exchange the load prediction information of the at least one first base station and the at least one second base station. Therefore, for specific content of step S303A and step S303B, reference may be made to each other, and the two steps need to be performed at the same time. The first prediction module and the second prediction module may exchange the load prediction information based on the information exchange periodicity in step S301A and step S301B, or may exchange the load prediction information after a specific event is triggered. This is not specifically limited in this application.

S304A: The first prediction module determines a load policy of the at least one first base station based on the load prediction information of the at least one first base station and the load prediction information of the at least one second base station.

In an implementation, that the first prediction module determines a load policy of the at least one first base station based on the load prediction information of the at least one first base station and the load prediction information of the at least one second base station includes the following steps.

Step 1: The first prediction module determines comprehensive load prediction information of the first prediction module based on the load prediction information of the at least one first base station and the load prediction information of the at least one second base station, which may specifically include the following.

The first prediction module determines local load prediction information of the at least one first base station based on the load prediction information of the at least one first base station, and the first prediction module determines flowing-out load prediction information of the at least one second base station based on the load prediction information of the at least one second base station. The first prediction module determines, from the flowing-out load prediction information of the at least one second base station, load prediction information of load that flows to the at least one first base station. The first prediction module determines the comprehensive load prediction information of the first prediction module based on the local load prediction information of the at least one first base station and the load prediction information of the load that flows to the at least one first base station. The comprehensive load prediction information of the first prediction module includes comprehensive load prediction information of the at least one first base station.

For example, the first prediction module is responsible for two first base stations (that is, the first base station 1 and the first base station 2), and the second prediction module is responsible for two second base stations (that is, the second base station 1 and the second base station 2).

The first prediction module determines load prediction information 1 of the first base station 1 and load prediction information 2 of the first base station 2, and the first prediction module has obtained the load prediction information of the second base station 1 and the load prediction information of the second base station 2 based on the first input information.

The load prediction information 1 of the first base station 1 includes local load prediction information (value) of the first base station 1 and flowing-out load prediction information (value) of the first base station 1. The load prediction information 2 of the first base station 2 includes local load prediction information (value) of the first base station 2 and flowing-out load prediction information (value) of the first base station 2.

For comprehensive load prediction information of the first base station 1, the first prediction module may first determine flowing-out load prediction information (value) of the second base station 1 and flowing-out load prediction information (value) of the second base station 2 based on the load prediction information of the second base station 1 and the load prediction information of the second base station 1, and then may determine, based on the flowing-out load prediction information (value) of the second base station 1 and the flowing-out load prediction information (value) of the second base station 2, load prediction information (that is, a load prediction value of load that flows from the second base station 1) of the load that flows from the second base station 1 to the first base station 1 and load prediction information (that is, a load prediction value of load that flows from the second base station 2) of the load that flows from the second base station 2 to the first base station 1.

It should be understood that a local load prediction value of the first base station 1 is a difference between a load prediction value of the first base station 1 and a flowing-out load prediction value of the first base station 1. The load prediction value of the first base station 1 may represent a corresponding load value in a case in which no terminal device in the first base station 1 is connected to another base station in a future specified time period or at a future specified time point. The local load prediction value of the first base station 1 may represent a corresponding load value in a case in which a part of terminal devices in the first base station 1 continue to be connected to the local base station in a future specified time period or at a future specified time point, and the flowing-out load prediction value of the second base station 1 may represent a corresponding load value in a case in which another part of terminal devices in the first base station 1 accesses another base station in a future specified time period or at a future specified time point.

Therefore, the comprehensive load prediction information (value) of the first base station 1 may meet the following formula:

Comprehensive load prediction value of the first base station 1=Local load prediction value of the first base station 1+Load prediction value of load that flows from a neighboring base station (load prediction value of load that flows from the second base station 1+load prediction value of load that flows from the second base station 2)

The comprehensive load prediction information (value) of the first base station 1 may represent comprehensive local load prediction information (value) of the first base station 1.

For comprehensive load prediction information of the first base station 2, the first prediction module may first determine flowing-out load prediction information of the second base station 1 and flowing-out load prediction information of the second base station 2 based on the load prediction information of the second base station 1 and the load prediction information of the second base station 1, and then may determine, based on the flowing-out load prediction information of the second base station 1 and the flowing-out load prediction information of the second base station 2, load prediction information (that is, a load prediction value of load that flows from the second base station 1) of the load that flows from the second base station 1 to the first base station 2 and load prediction information (that is, a load prediction value of load that flows from the second base station 2) of the load that flows from the second base station 2 to the first base station 2.

It should be understood that a local load prediction value of the first base station 2 is a difference between a load prediction value of the first base station 2 and a flowing-out load prediction value of the first base station 2. The load prediction value of the first base station 2 may represent a corresponding load value in a case in which no terminal device in the first base station 2 is connected to another base station in a future specified time period or at a future specified time point. The local load prediction value of the first base station 2 may represent a corresponding load value in a case in which a part of terminal devices in the first base station 2 continue to be connected to the local base station in a future specified time period or at a future specified time point, and the flowing-out load prediction value of the second base station 2 may represent a corresponding load value in a case in which another part of terminal devices in the first base station 2 accesses another base station in a future specified time period or at a future specified time point.

Therefore, the comprehensive load prediction information (value) of the first base station 2 may meet the following formula:

Comprehensive load prediction value of the first base station 2=Local load prediction value of the first base station 2+Load prediction value of load that flows from a neighboring base station (load prediction value of load that flows from the second base station 1+load prediction value of load that flows from the second base station 2)

The comprehensive load prediction information (value) of the first base station 2 may represent comprehensive local load prediction information (value) of the first base station 2.

It should be understood that the comprehensive load prediction information of the first prediction module includes the comprehensive load prediction information of the first base station 1 and the comprehensive load prediction information of the second base station 2.

Step 2: The first prediction module obtains comprehensive load prediction information of the second prediction module, and sends the comprehensive load prediction information of the first prediction module, where the comprehensive load prediction information of the second prediction module is obtained by the second prediction module based on the load prediction information of the at least one first base station and the load prediction information of the at least one second base station; and In this step, for a specific manner of determining the comprehensive load prediction information of the second prediction module, refer to the foregoing manner of determining the comprehensive load prediction information of the first prediction module. Details are not described herein again.

Step 3: The first prediction module determines a load policy of the first prediction module based on the comprehensive load prediction information of the first prediction module and the comprehensive load prediction information of the second prediction module.

For example, if the first prediction module predicts that comprehensive load of the first base station is high in a next specified time of T (T is a positive integer) while comprehensive load of a neighboring base station (the second base station) is low, a handover threshold for a UE to hand over from the cell of the first base station to the cell of the second base station may be reduced to achieve a load balancing effect.

It should be noted that, in the solution of this application, the first prediction module may determine the load policy for each first base station based on the comprehensive load prediction information of the at least one first base station and the comprehensive load prediction information of the at least one second base station, or the first prediction module may separately deliver the comprehensive load prediction information of the at least one first base station and the comprehensive load prediction information of the at least one second base station to each first base station, and the first base station determines an appropriate load policy. This is not specifically limited in this application. This is the same for the second prediction module.

S304B: The second prediction module determines a load policy of the at least one second base station based on the load prediction information of the at least one second base station and the load prediction information of the at least one first base station.

It should be noted that a manner in which the second prediction module determines the load policy of the at least one second base station is the same as a manner in which the first prediction module determines the load policy of the at least one first base station. Therefore, when step S304B is performed, reference may be specifically made to the foregoing step S304A, and details are not described herein again. In addition, step S304B and step S304A should be performed at the same time.

In an implementation, after steps S304A and S304B are performed, the first prediction module and the second prediction module further need to exchange the load policy, which may specifically include the following.

The first prediction module and the second prediction module further need to exchange the load policy. Further, the first prediction module may determine a final load policy based on the load policy of the first prediction module and the load policy of the second prediction module, and the first prediction module separately sends the final load policy to the at least one first base station. At the same time, the second prediction module may also determine a final load policy based on the load policy of the first prediction module and the load policy of the second prediction module, and the second prediction module separately sends the final load policy to the at least one second base station.

In addition, the first prediction module and the second prediction module further optimize functions of the first prediction module and the second prediction module based on an actual load change of a base station corresponding to prediction and inference, for example, feed back load prediction information based on actual local load, local flowing-out load, and cell load information, and refresh a corresponding AI function in the first prediction module, so that prediction and inference functions of the AI module can be enhanced.

In conclusion, this application provides the load balancing policy determining method. An artificial intelligence AI technology is combined with a conventional mobility load balancing MLB technology, that is, network running load can be accurately predicted using the AI technology, and an accurate MLB policy of high robustness can be inferred based comprehensive prediction load information, to balance network load, and therefore better improve network performance.

Based on the load balancing policy determining method provided in the foregoing embodiment, the following describes the technical solutions of this application in detail with reference to the following three specific examples.

Figure 5:
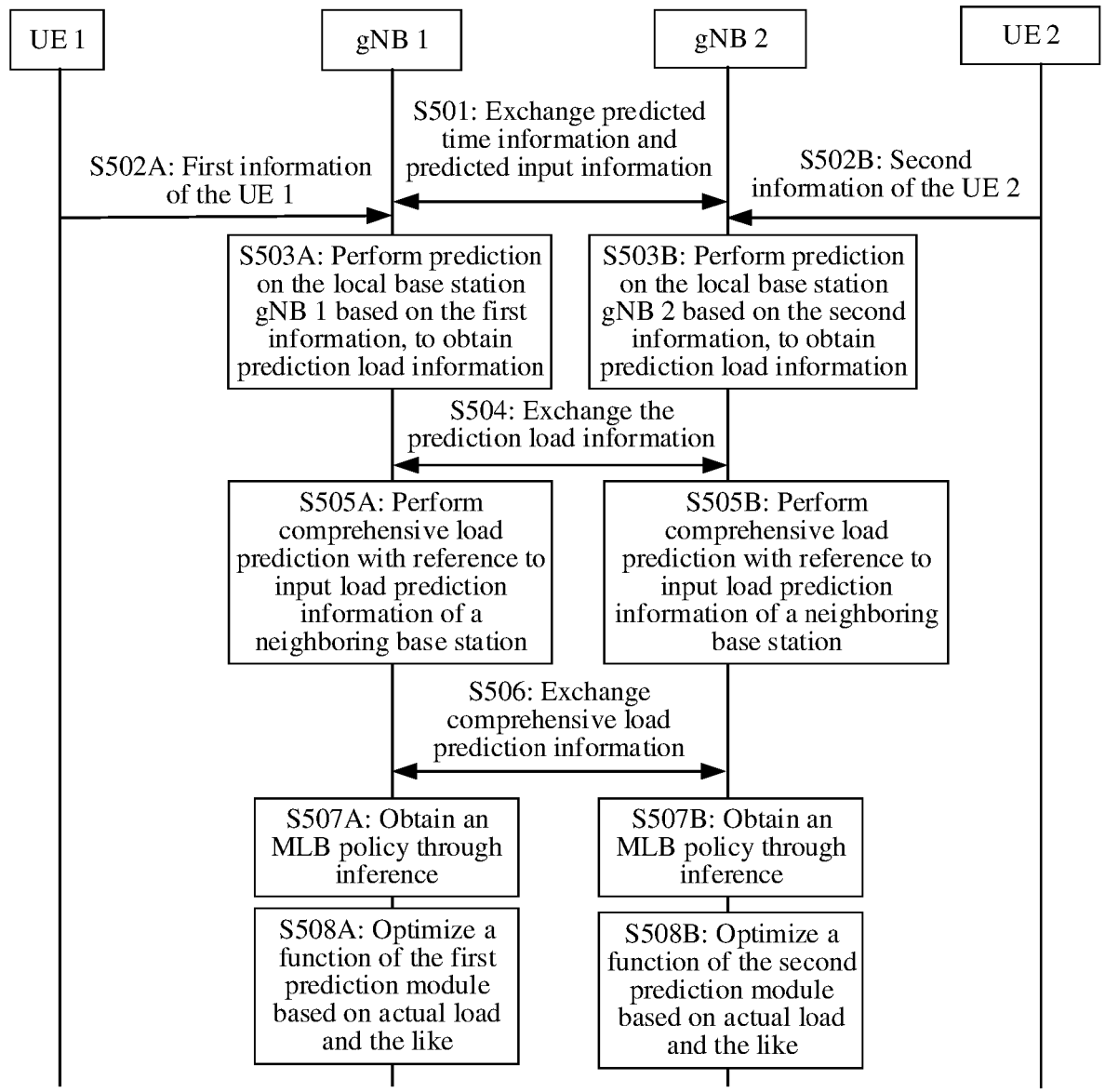
FIG. 5 is a schematic flowchart of a first example of a load balancing policy determining method according to an embodiment of this application.

In a first embodiment of this application, a first base station (a gNB 1) and a second base station (a gNB 1) are used as an example. A first prediction module AI 1 is located in the gNB 1, and the second prediction module AI 2 is located in a gNB 2. In other words, each base station has AI prediction and inference functions. FIG. 5 shows a specific implementation procedure of this embodiment.

S501: The gNB 1 and the gNB 2 exchange time information and predicted input information.

When step S501 is performed, the gNB 1 and the gNB 2 may directly exchange information in a wireless manner, or the gNB 1 and the gNB 2 may exchange and communicate information via a core network. This is not specifically limited in this application.

For example, the exchange time information between the gNB 1 and the gNB 2 may include a periodicity of exchanging various information between the gNB 1 and the gNB 2, for example, exchanging a load prediction result every 10 minutes, and exchanging comprehensive load prediction information every 20 minutes. The exchange time information between the gNB 1 and the gNB 2 may further include a load prediction periodicity of the first prediction module in the gNB 1 and a load prediction periodicity of the second prediction module in the gNB 2.

It should be noted that the gNB 1 and the gNB 2 may exchange various information based on the exchange time information, or may exchange information based on event triggering. This may not be specifically limited in this application.

Specifically, the gNB 1 sends first predicted input information to the gNB 2, where the first predicted input information indicates load prediction information that is of the gNB 2 and that needs to be provided by the gNB 2 to the gNB 1 in an information exchange periodicity. The gNB 2 sends second predicted input information to the gNB 1, where the second predicted input information indicates load prediction information that is of the gNB 1 and that needs to be provided by the gNB 1 to the gNB 2 in the information exchange periodicity.

Optionally, the first predicted input information or the second predicted input information may include but is not limited to load prediction information that needs to be specifically exchanged in an exchange time period, and input information required when a base station performs load prediction and MLB policy inference, for example, when the base station gNB 1 performs MLB policy inference, the base station gNB 2 needs to provide load of each cell of a neighboring base station.

In addition, when step S501 is performed, the gNB 1 and the gNB 2 may further exchange fluctuation indication information. The indication information may indicate whether the base station sends load fluctuation information. For example, when a load fluctuation of the gNB 1 or the gNB 2 in a future time period exceeds a specified threshold, the load fluctuation information is sent.

S502A: The gNB 1 obtains first information of a first terminal device (a UE 1).

When step S502A is performed, the UE 1 has established a communication connection to the gNB 1. The gNB 1 obtains the first information of the UE 1. The first information is used to assist the first prediction module in the gNB 1 in performing load prediction on the gNB 1 (that is, the first information may be used as input information for the gNB 1 to perform load prediction on the UE 1 and a first cell). The first information includes information about the UE 1 and/or information about the first cell. The UE 1 is located in the first cell, and the first cell is managed by the gNB 1.

Optionally, the first information may include but is not limited to at least one of the following: information about an existing service and a historical service of the UE 1 (for example, a current service type is a voice service, and a service data volume accounts for 80%), load prediction information of the first cell managed by the gNB 1 (for example, a current load prediction result of the first cell managed by the gNB 1 is that a capacity upper limit of 80% is reached in next 5 minutes) and historical load distribution information of the first cell managed by the gNB 1 (for example, a load change of the first cell in a past day), track prediction information of the UE 1 (for example, whether the UE 1 is connected to the local cell or leaves the local cell in a next specified time period), and a load capability of the gNB 1 (for example, maximum load of the gNB 1 meets a capacity of 1000 Mbit/s).

It should be understood that the first cell and the UE 1 also have a load prediction function. Therefore, the load prediction information of the first cell managed by the gNB 1 may be obtained by the first cell through prediction, the track prediction information of the UE 1 may be obtained by the UE 1 through prediction, and the load prediction information and the track prediction information are further sent to the first prediction module in the gNB 1.

It should be noted that, in a multiple radio access (MR-DC) scenario, the first information may further include a proportion of a duplication part in a service of the UE 1 (for example, 50% of the service of the UE 1 belongs to duplication transmission).

In addition, before step S502A is performed, the gNB 1 may further send indication information or request information to the UE 1, where the indication information may indicate the UE 1 to report the first information, and the request information may be used to obtain the first information of the UE 1.

S502B: The gNB 2 obtains second information of a UE 2.

When step S502B is performed, the UE 2 has established a communication connection to the gNB 2. The gNB 2 obtains the second information of the UE 2. The second information is used to assist the second prediction module in the gNB 2 in performing load prediction on the gNB 2 (that is, the second information may be used as input information for the gNB 2 to perform load prediction on the UE 2 and a second cell). The second information includes information about the UE 2 and/or information about the second cell. The second cell is managed by the gNB 2, and the UE 2 accesses the gNB 2 by using the second cell.

Optionally, the second information may include but is not limited to at least one of the following: information about an existing service and a historical service of the UE 2 (for example, a current service type is a voice service, and a service data volume accounts for 80%), load prediction information of the second cell managed by the gNB 2 (for example, a current load prediction result of the second cell managed by the gNB 2 is that a capacity upper limit of 80% is reached in next 5 minutes) and historical load distribution information of the second cell managed by the gNB 2 (for example, a load change of the first cell in a past day), track prediction information of the UE 2 (for example, whether the UE 2 is connected to the local cell or leaves the local cell in a next specified time period), and a load capability of the gNB 2 (for example, maximum load of the gNB 2 meets a capacity of 1000 Mbit/s).

It should be understood that the second cell and the UE 2 also have a load prediction function. Therefore, the load prediction information of the second cell managed by the gNB 2 may be obtained by the second cell through prediction, the track prediction information of the UE 2 may be obtained by the UE 2 through prediction, and the load prediction information and the track prediction information are further sent to the second prediction module in the gNB 2.

It should be noted that, in the MR-DC scenario, the second information may further include a proportion of a duplication part in a service of the UE 2 (for example, 50% of the service of the UE 2 belongs to duplication transmission).

In addition, before step S502B is performed, the gNB 2 may further send indication information or request information to the UE 2, where the indication information may indicate the UE 2 to report the second information, and the request information may be used to obtain the second information of the UE 2.

Step S502B and step S502A may be mutually referenced, and the two steps may be performed independently at the same time.

S503A: The gNB 1 performs load prediction on the local base station (the gNB 1) based on the first information, to obtain predicted load information of the gNB 1.

Optionally, after the gNB 1 obtains the first information from the UE 1, the gNB 1 includes the first prediction module (AI module), and the first prediction module may include a load prediction model of the first cell and/or a load prediction model of the first terminal device. The load prediction model of the first cell is obtained through training based on historical load information/data of the first cell, and load prediction model of the first terminal device is obtained through training based on historical load information/data of the first terminal device.

When step S503A is performed, the gNB 1 may perform the load prediction on the local base station gNB 1 based on the first information (that is, the first information is used as input information of the AI 1 module), to obtain the load prediction information of the gNB 1 (that is, output information of the AI 1 module). The load prediction information of the gNB 1 may be load prediction information of the UE 1 or load prediction information of the first cell managed by the gNB 1.

Therefore, the gNB 1 may perform the load prediction on the local base station (the gNB 1) based on the first information in but not limited to the following two manners.

First manner: The gNB 1 may determine, based on the information about the UE 1 that is included in the first information and an AI prediction model corresponding to the UE 1, load prediction information of the UE 1 in a next specified time period T or at a next specified time point, where T is a positive integer.

Specifically, in a first case, if there is only one UE 1 on a gNB 1 side, and the UE 1 still accesses the first cell of the gNB 1, load prediction information of the UE 1 in the next specified time period T or at the next specified time point that is predicted by the gNB 1 may be local load prediction information of the UE 1, that is, the load prediction information of the gNB 1 includes the local load prediction information of the UE 1. In a second case, if there is only one UE 1 on the gNB 1 side, and the UE 1 accesses another base station (for example, the gNB 2), load prediction information of the UE 1 in the next specified time period T or at the next specified time point that is predicted by the gNB 1 may be flowing-out load prediction information of the UE 1, that is, the load prediction information of the gNB 1 includes the flowing-out load prediction information of the UE 1.

If there are a plurality of UEs 1 on the gNB 1 side, the load prediction information of the UE 1 in the next specified time period T or at the next specified time point that is predicted by the gNB 1 may specifically include flowing-out load prediction information of the UE 1 in the gNB 1 (that is, corresponding load when the UE 1 in the gNB 1 accesses another base station) and local load prediction information of the UE 1 in the gNB 1 (that is, corresponding load when the UE 1 in the gNB 1 continues to access the local base station gNB 1).

For example, if a plurality of UEs 1 access the gNB 1, predicted flowing-out load information includes at least one of the following: target cell information (for example, an ID of another cell to which load of the UE 1 flows), a quantity of UEs 1 that flow to the target cell (for example, a quantity of UEs 1 that flow to the target cell is 10 in a next specified time T), estimated flowing-out PRB occupation, flowing-out PDCCH CCE occupation, service type and service distribution information of the flowing-out UE 1, and load fluctuation information (the load fluctuation information includes load distribution information that is greater than or less than a specified threshold in a next specified time T). The local load prediction information may indicate load information of the UE 1 that is still connected to the currently served first cell in the next specified time T.

Second manner: The gNB 1 may determine, based on the information about the first cell that is included in the first information and the AI prediction model corresponding to the first cell, the load prediction information of the first cell in the next specified time period T or at the next specified time point.

Specifically, the load prediction information of the first cell may be calculated with reference to or based on the load prediction information of the UE 1 that has accessed the gNB 1 in the foregoing first implementation. Details are not described herein again.

S503B: The gNB 2 performs prediction on the local base station gNB 2 based on the second information, to obtain predicted load information of the gNB 2.

Optionally, after the gNB 2 obtains the second information from the UE 2, the gNB 2 includes the second prediction module (AI module), and the second prediction module may include a load prediction model of the second cell and/or a load prediction model of the second terminal device. The load prediction model of the second cell is obtained through training based on historical load information/data of the second cell, and the load prediction model of the second terminal device is obtained through training based on historical load information/data of the second terminal device.

Specifically, for how to obtain the load prediction model by the second prediction module (AI 2 module) in the gNB 2, refer to S503A. Details are not described herein again.

When step S503B is performed, the gNB 2 may perform the load prediction on the local base station gNB 2 based on the second information (that is, the second information is used as input information of the AI 2 module), to obtain the load prediction information of the gNB 2 (that is, output information of the AI 2 module). The load prediction information of the gNB 2 may be load prediction information of the UE 2 or load prediction information of the second cell managed by the gNB 2.

Therefore, the gNB 2 may perform the load prediction on the local base station (the gNB 2) based on the second information in but not limited to the following two manners.

First manner: The gNB 2 may determine, based on the information about the UE 2 that is included in the second information and an AI prediction model corresponding to the UE 2, load prediction information of the UE 2 in the next specified time period T or at the next specified time point, where T is a positive integer.

Specifically, in a first case, if there is only one UE 2 on a gNB 2 side, and the UE 2 still accesses the second cell of the gNB 2, load prediction information of the UE 2 in the next specified time period T or at the next specified time point that is predicted by the gNB 2 may be local load prediction information of the UE 2, that is, the load prediction information of the gNB 2 includes the local load prediction information of the UE 2. In a second case, if there is only one UE 2 on the gNB 2 side, and the UE 2 accesses another base station (for example, the gNB 1), load prediction information of the UE 2 in the next specified time period T or at the next specified time point that is predicted by the gNB 2 may be flowing-out load prediction information of the UE 2, that is, the load prediction information of the gNB 2 includes the flowing-out load prediction information of the UE 2.

If there are a plurality of UEs 2 on the gNB 2 side, the load prediction information of the UE 2 in the next specified time period T or at the next specified time point that is predicted by the gNB 2 may specifically include flowing-out load prediction information of the UE 2 in the gNB 2 (that is, corresponding load when the UE 2 in the gNB 2 accesses another base station) and local load prediction information of the UE 2 in the gNB 2 (that is, corresponding load when the UE 2 in the gNB 1 continues to access the local base station gNB 2).

For example, if a plurality of UEs 2 access the gNB 2, predicted flowing-out load information includes at least one of the following: target cell information (for example, an ID of another cell to which load of the UE 2 flows), a quantity of UEs 2 that flow to the target cell (for example, a quantity of UEs 2 that flow to the target cell is 10 in a next specified time T), estimated flowing-out PRB occupation, flowing-out PDCCH CCE occupation, service type and service distribution information of the flowing-out UE 2, and load fluctuation information (the load fluctuation information includes load distribution information that is greater than or less than a specified threshold in a next specified time T). The local load prediction information may indicate load information of the UE 2 that is still connected to the currently served second cell in the next specified time T.

Second manner: The gNB 2 may determine, based on the information about the second cell that is included in the second information and the AI prediction model corresponding to the second cell, the load prediction information of the second cell in the next specified time period T or at the next specified time point.

Specifically, the load prediction information of the second cell may be calculated with reference to or based on the load prediction information of the UE 2 that has accessed the gNB 2 in the first implementation of S503B. Details are not described herein again.

It should be noted that, step S503B and step S503A may be mutually referenced, and the two steps need to be performed independently at the same time.

S504: The gNB 1 and the gNB 2 exchange the load prediction information.

When step S504 is performed, the gNB 1 and the gNB 2 may exchange respective load prediction information based on the exchange time information and the predicted input information that are between the gNB 1 and the gNB 2 in step S501.

Specifically, in step S501, the gNB 1 has obtained the exchange time information and the first predicted input information from the gNB 2. The gNB 1 may determine an exchange time based on the exchange time information, and then obtain corresponding load prediction information of the gNB 2 based on the first predicted input information in the exchange time. At the same time, in step S501, the gNB 2 has also obtained the exchange time information and the predicted input information from the gNB 1. The gNB 2 may determine an exchange time based on the exchange time information, and obtain corresponding load prediction information (that is, corresponding predicted load information requested by the second predicted input information) of the gNB 1 in the exchange time based on the second predicted input information.

For the first predicted input information and the second predicted input information, refer to the descriptions of step S501. Details are not described herein again.

It should be noted that in step S501, the gNB 1 and the gNB 2 may further exchange information based on event triggering. Therefore, the gNB 1 and the gNB 2 may alternatively perform step S504 based on a trigger event. However, a specific trigger event is not specifically limited in this application. For example, after obtaining the corresponding load prediction information or after a specified condition is met, the gNB 1 or the gNB 2 may trigger information exchange.

S505A: The gNB 1 performs comprehensive load prediction with reference to input load prediction information of a neighboring base station (the gNB 2).

When S505A is performed, the gNB 1 may determine comprehensive load prediction information of the gNB 1 based on the load prediction information of the local base station and load prediction information of load that flows from the neighboring base station (the gNB 2). The comprehensive load prediction information of the gNB 1 may represent a local comprehensive load prediction value of the gNB 1 in the next specified time period T or at the next specified time point.

When there is only one UE 1 on the gNB 1 side, the comprehensive load prediction value of the gNB 1 may meet the following formula:

Comprehensive load prediction value of the gNB 1=Local load prediction value of the local base station (the gNB 1)+Load prediction value of load that flows from the neighboring base station gNB 2

Specifically, the local load prediction value of the local base station (the gNB 1) may be obtained based on the local load prediction information of the UE 1 in the first manner (in the first case) of step S503A, or the local load prediction value of the local base station (the gNB 1) may be obtained based on the local load prediction information of the first cell in the second manner of step S503A. Details are not described herein again.

When there are only a plurality of UEs 1 on the gNB 1 side, the comprehensive load prediction value of the gNB 1 may meet the following formula:

Comprehensive load prediction value of the gNB 1=Local load prediction value of the local base station (the gNB 1)+Load prediction value of load that flows from the neighboring base station gNB 2

The local load prediction value of the local base station (the gNB 1) may be obtained based on the local load prediction information of the UE 1 in the gNB 1 in the first manner of step S503A (that is, when there are only a plurality of UEs 1 on the gNB 1 side).

The load prediction value of load that flows from the neighboring base station (for example, the gNB 2) may be obtained in the following manner: the gNB 1 may first determine, based on the load prediction information of the gNB 2 that is obtained in step S504, load prediction information (that is, corresponding load information when the UE 2 in the gNB 2 accesses the gNB 1) of load that flows from the neighboring base station (the gNB 2) to the gNB 1. Further, the load prediction value of load that flows from the neighboring base station (the gNB 2) is determined based on the load prediction information of load that flows from the neighboring base station (the gNB 2) to the gNB 1.

It should be noted that the comprehensive load prediction information of the gNB 1 may further include prediction information of a service type of the UE 1, prediction information of load fluctuation, and the like.

S505B: The gNB 2 performs comprehensive load prediction with reference to input load prediction information of a neighboring base station (the gNB 1).

When S505B is performed, the gNB 2 may determine comprehensive load prediction information of the gNB 2 based on the load prediction information of the local base station and load prediction information of load that flows from the neighboring base station (the gNB 1). The comprehensive load prediction information of the gNB 2 may represent a local comprehensive load prediction value of the gNB 1 in the next specified time period T or at the next specified time point.

Specifically, step S505B may be specifically implemented with reference to the manner of step S505A. Details are not described herein again. In addition, steps S505A and S505B need to be performed independently at the same time.

S506: The gNB 1 and the gNB 2 exchange the comprehensive load prediction information.

The gNB 1 may determine, based on the exchange time information agreed between the gNB 1 and the gNB 2 in step S501, time information for exchanging comprehensive prediction information, so that the gNB 1 and the gNB 2 exchange the comprehensive load prediction information with each other in a time for exchanging the comprehensive prediction information. To be specific, the gNB 1 sends the comprehensive load prediction information of the gNB 1 to the gNB 2, and receives the comprehensive load prediction information of the gNB 2, and at the same time, the gNB 2 sends the comprehensive load prediction information of the gNB 2 to the gNB 1, and receives the comprehensive load prediction information of the gNB 1.

It should be noted that, in step S501, in addition to exchanging information with each other based on a periodicity, the gNB 1 and the gNB 2 may further allow information exchange based on event triggering. Therefore, when the gNB 1 and the gNB 2 exchange the comprehensive load prediction information, information exchange may alternatively be performed based on event triggering. This is not specifically limited herein.

In addition, the gNB 1 and the gNB 2 may directly communicate with each other, to exchange (exchange) respective comprehensive load prediction information, or may exchange information via the core network. This is not specifically limited in this application.

S507A: The gNB 1 may obtain an MLB policy of the gNB 1 through inference based on the comprehensive load prediction information (value) of the gNB 1 and the comprehensive load prediction information (value) of the gNB 1.

Specifically, the gNB 1 may formulate the mobility load balancing (MLB) policy of the gNB 1 based on the comprehensive load prediction information (obtained in step S505A) of the gNB 1 and the comprehensive load prediction information (obtained in step S506) of the gNB 2.

For example, the MLB policy of the first base station gNB 1 may be as follows: If the gNB 1 determines that the comprehensive load prediction value of the local base station gNB 1 is high in the next specified time T or at the specified time point while the comprehensive load prediction value of the gNB 2 is low, the gNB 1 may reduce a handover threshold for the UE 1 to hand over from the gNB 1 to the gNB 2. Therefore, in the next specified time T or at the next specified time point, when comprehensive load of the gNB 1 is excessively high, the UE 1 may be handed over to the gNB 2 to work, to implement load balancing.

S507B: The gNB 2 obtains an MLB policy of the gNB 2 through inference.

Specifically, the gNB 2 may formulate the mobility load balancing (MLB) policy of the gNB 2 based on the comprehensive load prediction information (obtained in step S505B) of the gNB 1 and the comprehensive load prediction information (obtained in step S506) of the gNB 2.

It should be noted that, for step S507B, reference may be made to the foregoing descriptions of step S507A, and details are not described herein again. In addition, the two steps need to be performed independently at the same time.

S508A: The gNB 1 optimizes a function of the first prediction module in the gNB 1 based on actual load and the like.

For example, the gNB 1 feeds back the load prediction information based on a predicted actual load change at a corresponding time, for example, based on actual local load information, actual flowing-out load information, and actual cell load information, and further refreshes the function of the first prediction module (AI 1 module) in the gNB 1, that is, performs reinforcement learning on AI inference and prediction models, so that a load prediction capability of the first prediction module (AI 1 module) in the gNB 1 can be more accurate. A specific optimization manner is not specifically limited in this application.

For example, the gNB 1 may determine a corresponding error value based on the load prediction information (value) of the gNB 1 and actual load information (value) of the gNB 1, and further adjust reference/an attribute of the AI 1 module (AI model) based on the error value, to optimize the AI 1 module.

S508B: The gNB 2 may optimize a function of the second prediction module in the gNB 2 based on actual load and the like.

It should be noted that, for step S508B, reference may be made to the foregoing step S508A, and details are not described herein again. In addition, the two steps may be performed independently at the same time, or may not be performed at the same time.

It should be noted that, in the foregoing example, the solutions of this application are described by using an example in which both the gNB 1 side and the gNB 2 side obtain related information by using one UE. However, in practice, each base station serves not limited to one UE, and may serve a plurality of UEs. Therefore, related information of the UE that is obtained by the gNB 1 and the gNB 2 is not limited to information of one UE.

In conclusion, in the first example, the AI module is disposed in the base station, and more input information for load prediction is added. By using the AI module, load prediction information of the base station in a future specified time period or at a future specified time point can be accurately obtained, an MLB policy of the base station in the future specified time period or at the future specified time point can be inferred, and finally reinforcement learning is further performed on the AI module in the base station based on actual load. The method can not only improve accuracy of predicting load by the AI module, but also improve robustness and performance of the MLB policy.

Figure 6:
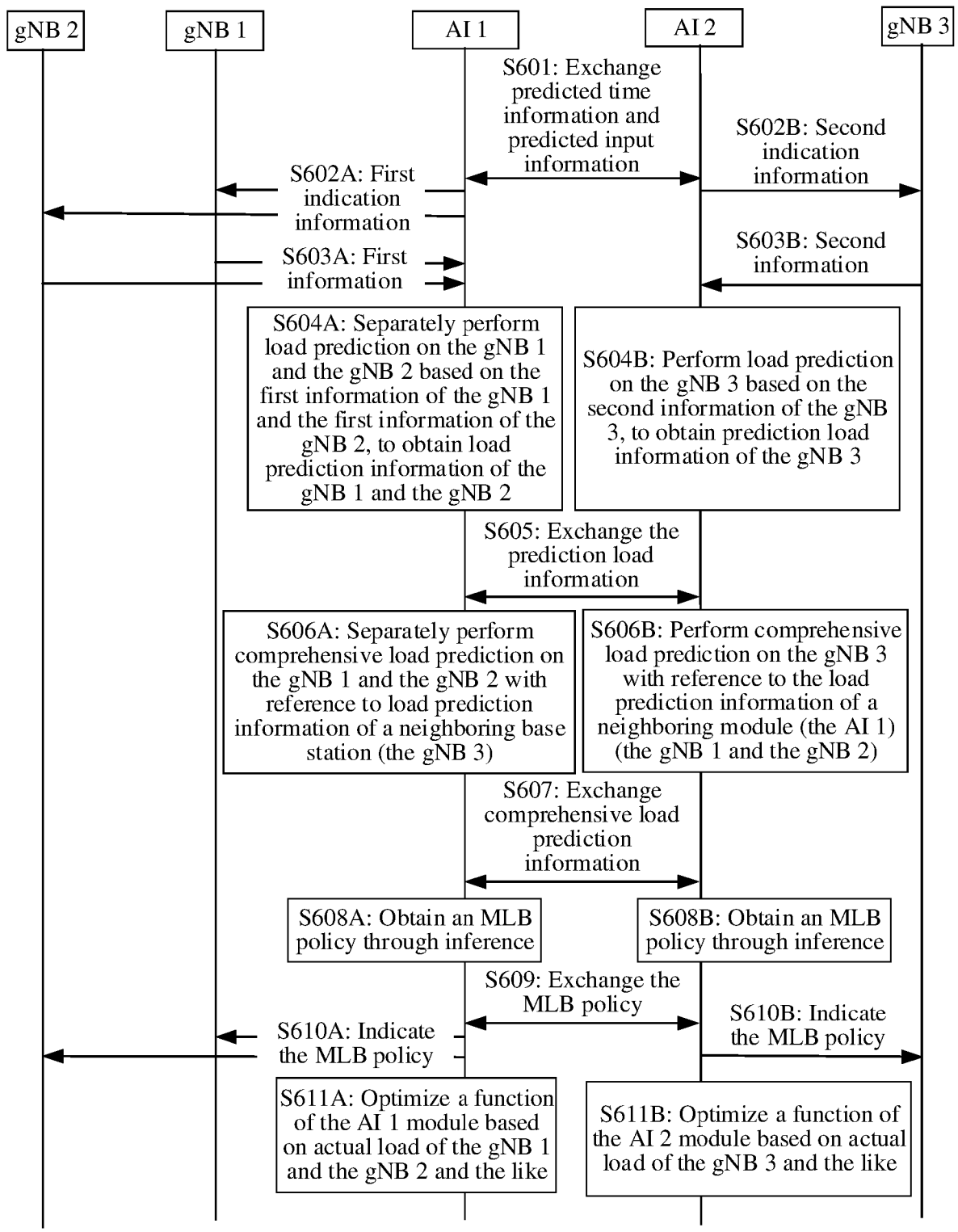
FIG. 6 is a schematic flowchart of a second example of a load balancing policy determining method according to an embodiment of this application.

In a second embodiment of this application, the first prediction module (AI 1 module) is independent of the base station. To be specific, the AI 1 module may be located in another apparatus or device other than the gNB 1 and the gNB 2, and the AI 1 module may be configured to predict load information of the gNB 1 and the gNB 2 and infer MLB policies of the gNB 1 and the gNB 2. The second prediction module AI 2 is also independent of the base station. To be specific, the AI 2 module may be located in another apparatus or device other than the gNB 3, and the AI 2 module may be configured to predict load information of the gNB 3 and infer an MLB policy of the gNB 3. FIG. 6 shows a specific implementation procedure of this embodiment.

S601: A first prediction module (AI 1 module) and a second prediction module (AI 2 module) exchange time information and predicted input information.

Specifically, when step S6*oi* is performed, refer to the exchange of the time information and the predicted input information between a gNB 1 (equivalent to the AI 1 module) and a gNB 2 (equivalent to the AI 2 module) in step S501. Details are not described herein again.

It should be understood that, in this step, the AI 1 module needs to send, to the AI 2 module, predicted input information corresponding to two base stations (the gNB 1 and the gNB 2), to respectively indicate the AI 2 module to provide load prediction information of two gNBs 3 for the AI 1 module. Load prediction information of one gNB 3 is used to assist the AI 1 module in performing comprehensive load prediction on the gNB 1, and load prediction information of the other gNB 3 is used to assist the AI 1 module in performing comprehensive load prediction on the gNB 2. In addition, the AI 2 module needs to send the predicted input information of the gNB 3 to the AI 1 module, which may specifically indicate which load prediction information of the gNB 1 needs to be provided by the AI 1 module to the AI 2 module, and which load prediction information of the gNB 2 needs to be provided by the AI 1 module to the AI 2 module.

It should be noted that information exchange may be performed by directly establishing an interface between the AI 1 module and the AI 2 module, or information exchange may be performed via a base station, or information exchange may be performed via a core network. This is not specifically limited in this application.

S602A: The AI 1 module separately sends first indication information to the gNB 1 and the gNB 2, where the first indication information indicates the gNB 1 and the gNB 2 to respectively send first information to the AI 1 module.

S602B: The AI 2 module sends second indication information to the gNB 3, where the second indication information indicates the gNB 3 to send second information to the AI 2 module.

It should be noted that, in S602A and S602B, information that is indicated by the AI module and that needs to be collected by the base station, for example, the first information in step S502A or the second information in step S502B may be periodically reported to the corresponding AI module, or may be reported to the corresponding AI module based on event triggering. If the information is periodically reported by the base station, the indication information sent by the AI module may further include a reporting periodicity corresponding to reporting the information by the base station in each periodicity. If a measurement result is reported based on event triggering, the indication information sent by the AI module may further include a trigger event corresponding to reporting information based on event triggering, for example, a threshold and a threshold.

S603A: The AI 1 module separately obtains the first information sent by the gNB 1 and the gNB 2.

Specifically, for that the AI 1 module separately obtains the first information sent by the gNB 1 and the gNB 2, refer to step S502A. Details are not described herein again.

S603B: The AI 2 module obtains the second information sent by the gNB 3.

Specifically, for that the AI 2 module obtains the second information sent by the gNB 3, refer to step S502B. Details are not described herein again.

In addition, step S603B and step S603A may be performed independently at the same time, or may not be performed at the same time.

S604A: The AI 1 module separately performs load prediction on the gNB 1 and the gNB 2 based on the first information of the gNB 1 and the first information of the gNB 2, to obtain load prediction information of the gNB 1 and the gNB 2.

When the AI 1 module performs step S604A, the following is included: The AI 1 module performs the load prediction on the gNB 1 based on the first information of the gNB 1, to obtain the load prediction information of the gNB 1; and the AI 1 module performs the load prediction on the gNB 2 based on the first information of the gNB 2, to obtain the load prediction information of the gNB 2.

Specifically, the AI 1 module obtains the load prediction information of the gNB 1 based on the first information of the gNB 1, and the AI 1 module obtains the load prediction information of the gNB 2 based on the first information of the gNB 2. For a specific execution process, refer to step S503A. Details are not described herein again.

S604B: The AI 2 module performs load prediction on the gNB 3 based on the second information of the gNB 3, to obtain prediction load information of the gNB 3.

Specifically, the AI 2 module obtains the load prediction information of the gNB 3 based on the second information of the gNB 3. For a specific execution process, refer to step S503B. Details are not described herein again.

S605: The AI 1 module and the AI 2 module exchange the load prediction information.

When the AI 1 module performs step S605, refer to step S504. Details are not described herein again.

It should be noted that the AI 1 module needs to obtain the corresponding load prediction information of the gNB 3 based on two pieces of predicted input information (predicted input information of the gNB 1 and predicted input information of the gNB 2).

S606A: The AI 1 module separately performs comprehensive load prediction on the gNB 1 and the gNB 2 with reference to load prediction information of a neighboring base station (the gNB 3).

When the AI 1 module performs step S606A, the following is included: The AI 1 module performs the comprehensive load prediction on the gNB 1 with reference to the input load prediction information of the neighboring base station (the gNB 3), to obtain comprehensive load prediction information of the gNB 1; and at the same time, the AI 1 module performs the comprehensive load prediction on the gNB 2 with reference to the input load prediction information of the neighboring base station (the gNB 3), to obtain comprehensive load prediction information of the gNB 2.

Specifically, for that the AI 1 module performs the comprehensive load prediction on the gNB 1 with reference to the input load prediction information of the neighboring base station (the gNB 3) and the AI 1 module performs the comprehensive load prediction on the gNB 2 with reference to the input load prediction information of the neighboring base station (the gNB 3), refer to step S505A. Details are not described herein again.

S606B: The AI 2 module performs comprehensive load prediction on the gNB 3 with reference to the load prediction information of a neighboring module (AI 1) (the gNB 1 and the gNB 2).

When the AI 2 module performs step S606B, the following is included: The AI 1 module performs the comprehensive load prediction on the gNB 3 with reference to the input load prediction information of the gNB 1 and the gNB 2, to obtain comprehensive load prediction information of the gNB 3.

Specifically, the AI 2 module performs the comprehensive load prediction on the gNB 3 with reference to the input load prediction information of the gNB 1 and the gNB 2, to obtain the comprehensive load prediction information of the gNB 3. For details, refer to step S505B. Details are not described herein again.

It should be noted that, in this step, in a process of calculating the comprehensive load prediction information of the gNB 3, the AI 2 module needs to obtain the comprehensive load prediction information of the gNB 3 based on local load prediction information of the gNB 3, load prediction information of load that flows from the gNB 1 to the gNB 3 (that is, a case in which the UE 1 in the gNB 1 accesses the gNB 3), and load prediction information of load that flows from the gNB 2 to the gNB 3 (that is, a case in which the UE 2 in the gNB 2 accesses the gNB 3).

S607: The AI 1 module and the AI 2 module exchange the comprehensive load prediction information.

Specifically, for step S607, refer to step S506. Details are not described herein again.

It should be noted that the comprehensive load prediction information sent by the AI 1 module to the AI 2 module includes the comprehensive load prediction information of the gNB 1 and the comprehensive load prediction information of the gNB 2. The AI 1 module receives the comprehensive load prediction information of the gNB 3. At the same time, the AI 2 module also performs a corresponding step.

S608A: The AI 1 module obtains an MLB policy of the gNB 1 and an MLB policy of the gNB 2 through inference.

The AI 1 module obtains the MLB policy of the gNB 1 through inference based on the comprehensive load prediction information of the gNB 1, the comprehensive load prediction information of the gNB 2, and the comprehensive load prediction information of the gNB 3, and the AI 1 module obtains the MLB policy of the gNB 2 through inference based on the comprehensive load prediction information of the gNB 1, the comprehensive load prediction information of the gNB 2, and the comprehensive load prediction information of the gNB 3. For details, refer to step S607A. Details are not described herein again.

S608B: The AI 2 module obtains an MLB policy of the gNB 3 through inference.

Specifically, the AI 2 module may obtain the MLB policy of the gNB 3 through inference based on the comprehensive load prediction information of the gNB 1, the comprehensive load prediction information of the gNB 2, and the comprehensive load prediction information of the gNB 3. For details, refer to the step S607B. Details are not described herein again.

S609: The AI 1 module and the AI 2 module exchange the MLB policy.

The AI 1 module and the AI 2 module exchange the MLB policy to determine a final MLB policy.

Specifically, the AI 1 module obtains the MLB policy of the gNB 3, and sends the MLB policy of the gNB 1 and the MLB policy of the gNB 2 to the AI 2 module.

The AI 1 module may coordinate with the AI 2 module to determine the final MLB policy based on the MLB policy of the gNB 1, the MLB policy of the gNB 2, and the MLB policy of the gNB 3.

S610A: The AI 1 module delivers the final MLB policy to the gNB 1 and the gNB 2.

The gNB 1 and the gNB 2 execute the final MLB policy.

S610B: The AI 2 module delivers the final MLB policy to the gNB 3.

The gNB 3 executes the final MLB policy.

Step S610B and step S610A may be performed independently at the same time, or may not be performed at the same time.

It should be noted that when the foregoing steps S608A to S610B are performed, the following may be further included. After the AI 1 module and the AI 2 module exchange the comprehensive load prediction information, the AI 1 module delivers the comprehensive load prediction information of the gNB 1, the gNB 2, and the gNB 3 to the base stations gNB 1 and gNB 2, and the gNB 1 and the gNB 2 determine the MLB policy. In addition, the AI 2 module may also deliver the comprehensive load prediction information of the gNB 1, the gNB 2, and the gNB 3 to the base station gNB 3, and the gNB 3 determines the MLB policy.

S611A: The AI 1 module may optimize a function of the AI 1 module based on actual load of the gNB 1 and the gNB 2 and the like.

Specifically, when the AI 1 module performs step S611A, refer to step S508A. Details are not described herein again.

S611B: The AI 2 module may optimize a function of the AI 2 module based on actual load of the gNB 3 and the like.

Specifically, when the AI 2 module performs step S611B, refer to step S508B. Details are not described herein again.

Step S611B and step S611A may be performed independently at the same time, or may not be performed at the same time.

In conclusion, in the second example, based on an independent AI module and more added input information for load prediction, load prediction information of the base station in a future specified time period or at a future specified time point can be accurately obtained, an MLB policy of the base station in the future specified time period or at the specified time point can be inferred, and reinforcement learning is further performed on a corresponding independent AI module based on actual network load. The method can not only improve accuracy of predicting load by the AI module, but also improve robustness and performance of the MLB policy.

Figure 7:
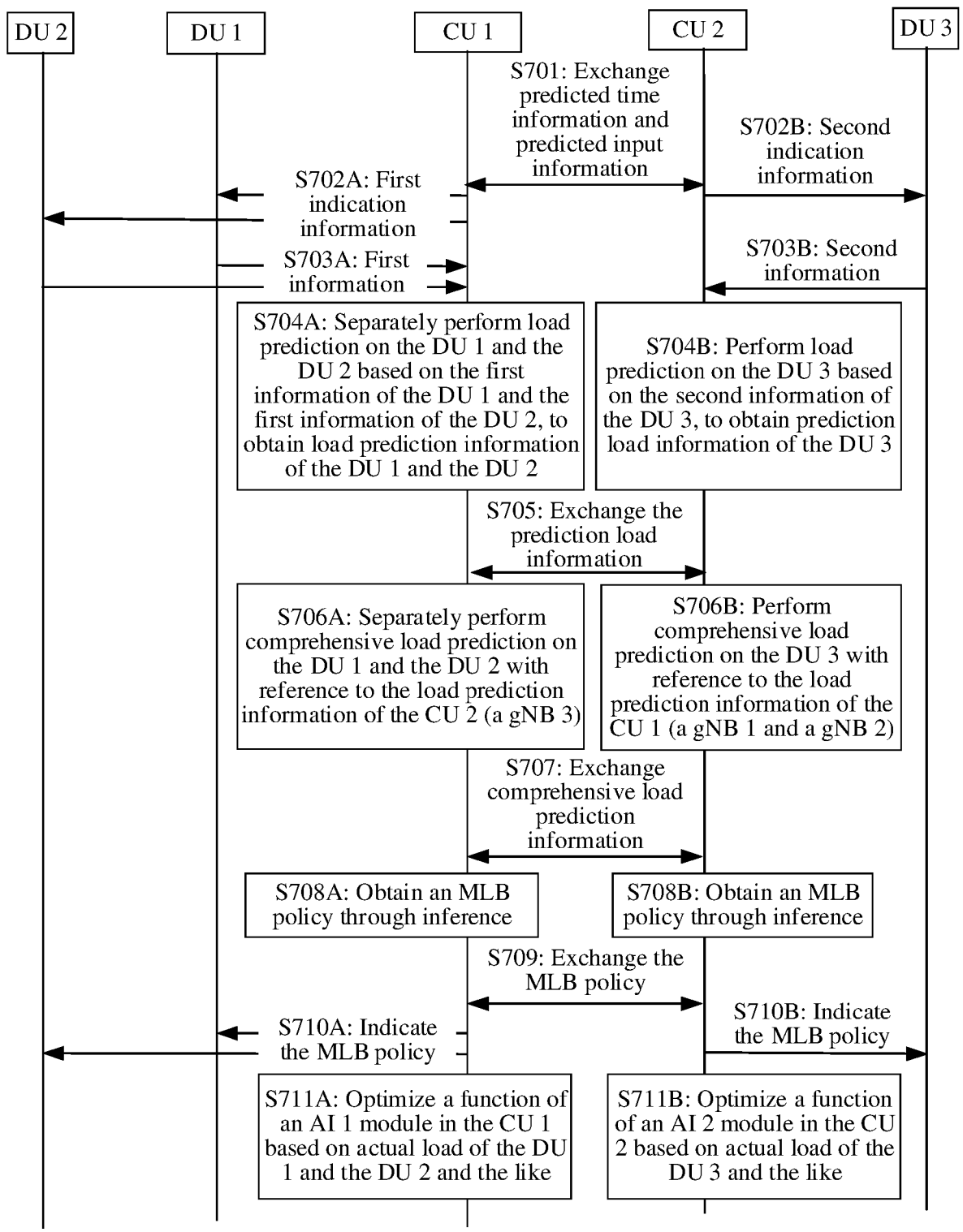
FIG. 7 is a schematic flowchart of a third example of a load balancing policy determining method according to an embodiment of this application.

In a third embodiment of this application, based on the second embodiment, in a CU-DU architecture, the AI module is located in a CU, that is, the CU has AI prediction and inference functions. FIG. 7 shows a specific implementation procedure of this embodiment.

S701: A CU 1 and a CU 2 exchange time information and predicted input information.

Specifically, the CU 1 (equivalent to the AI 1 module) and the CU 2 (equivalent to the AI 2 module) exchange the time information and the predicted input information. For this step, refer to the foregoing step S601 or S501. Details are not described herein again.

S702A: The CU 1 separately sends first indication information to a DU 1 and a DU 2, where the first indication information indicates the DU 1 and the DU 2 to separately send first information to the CU 1.

Specifically, the CU 1 separately sends the first indication information to the DU 1 (equivalent to the gNB 1) and the DU 2 (equivalent to the gNB 2). The first indication information indicates the DU 1 and the DU 2 to separately send the first information to the CU 1. For details, refer to step S602A. Details are not described herein again.

S702B: The CU 2 sends second indication information to a DU 3, where the second indication information indicates the DU 3 to send second information to the CU 2.

Specifically, the CU 2 (equivalent to the AI 2 module) sends the second indication information to the DU 3 (equivalent to the gNB 3). The second indication information indicates the DU 3 to send the second information to the CU 2. For this step, refer to the foregoing step S602B. Details are not described herein again.

S703A: The CU 1 separately obtains the first information sent by the DU 1 and the DU 2.

For step S703A, refer to step S602A or S502A. Details are not described herein again.

S703B: The CU 2 obtains the second information sent by the DU 3.

For step S703B, refer to step S602B or S502B. Details are not described herein again.

S704A: The CU 1 separately performs load prediction on the DU 1 and the DU 2 based on the first information of the DU 1 and the first information of the DU 2, to obtain load prediction information of the DU 1 and the DU 2.

For step S704A, refer to step S604A or S503A. Details are not described herein again.

S704B: The CU 2 module performs load prediction on the DU 3 based on the second information of the DU 3, to obtain prediction load information of the DU 3.

For step S704B, refer to step S604B or S503B. Details are not described herein again.

S705: The CU 1 and the CU 2 exchange the load prediction information.

For step S705, refer to step S605 or S504. Details are not described herein again.

S706A: The CU 1 separately performs comprehensive load prediction on the DU 1 and the DU 2 with reference to the load prediction information of the CU 2 (the gNB 3).

For step S706A, refer to step S606A or S505A. Details are not described herein again.

S706B: The CU 2 module performs comprehensive load prediction on the DU 3 with reference to the load prediction information of the CU 1 (the gNB 1 and the gNB 2).

For step S706B, refer to step S606B or S505B. Details are not described herein again.

S707: The CU 1 and the CU 2 module exchange the comprehensive load prediction information.

For step S707, refer to step S607 or S506. Details are not described herein again.

S708A: The CU 1 obtains an MLB policy of the DU 1 and an MLB policy of the DU 2 through inference.

For step S708A, refer to step S608A or S507A. Details are not described herein again.

S708B: The CU 2 obtains an MLB policy of the DU 3 through inference.

For step S708B, refer to step S608B or S507B. Details are not described herein again.

S709: The CU 1 and the CU 2 exchange the MLB policy to determine a final MLB policy.

For step S709, refer to step S609. Details are not described herein again.

S710A: The CU 1 delivers the final MLB policy to the DU 1 and the DU 2.

The DU 1 and the DU 2 execute the final MLB policy.

For step S710A, refer to step S610A. Details are not described herein again.

S710B: The CU 2 delivers the final MLB policy to the DU 3.

The DU 3 executes the final MLB policy.

For step S710B, refer to step S610B. Details are not described herein again.

S711A: The CU 1 may optimize a function of the AI 1 module in the CU 1 based on actual load of the DU 1 and the DU 2 and the like.

Specifically, when the CU 1 performs step S711A, refer to step S611A or step S508A. Details are not described herein again.

S711B: The CU 2 may optimize a function of the AI 2 module in the CU 2 based on actual load of the DU 3 and the like.

Specifically, when the CU 2 performs step S711B, refer to step S611B or step S508B. Details are not described herein again.

In conclusion, in the third example, the AI module is disposed in the CU (that is, the CU has prediction and inference functions), and more input information for load prediction is added. By using the CU, load prediction information of the DU in a future specified time period or at a future specified time point can be accurately obtained, an MLB policy of the DU in the future specified time period or at the future specified time point can be inferred, and finally reinforcement learning is further performed on the prediction and inference functions of the CU in the base station based on actual load. The method can not only improve accuracy of predicting load by the CU, but also improve robustness and performance of the MLB policy.

Based on a same technical concept, an embodiment of this application provides a mobility load balancing policy determining apparatus. The apparatus may include modules or units that are in a one-to-one correspondence with the described methods/operations/steps/actions performed by the first prediction module in the foregoing method embodiments. The module or unit may be a hardware circuit, or may be software, or may be implemented by a hardware circuit in combination with software. The apparatus may have a structure as shown in FIG. 8.

Figure 8:
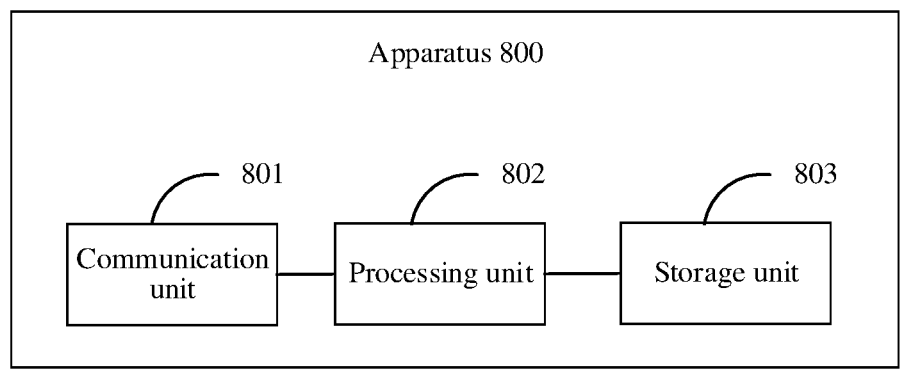
FIG. 8 is a schematic diagram of a structure of a load balancing policy determining apparatus according to an embodiment of this application.

As shown in FIG. 8, the apparatus 800 may include a communication unit 801, a processing unit 802, and a storage unit 803. The following describes the units in detail.

The communication unit 8*oi* may be configured to obtain first information of at least one first base station, where the first information is used to assist a first prediction module in performing load prediction on the at least one first base station, the first information of one first base station includes information about a first cell and information about a first terminal device located in the first cell, and the first cell is managed by the first base station.

The processing unit 802 may be configured to separately determine load prediction information of the at least one first base station based on the first information of the at least one first base station, where the load prediction information of each first base station includes load prediction information of a corresponding first cell and/or load prediction information of a corresponding first terminal device.

The communication unit 8*oi* may be further configured to obtain load prediction information of at least one second base station from a second prediction module, where the load prediction information of each second base station includes load prediction information of a corresponding second cell and/or load prediction information of a second terminal device located in the second cell, and the second cell is managed by the second base station.

The processing unit 802 is further configured to determine a load policy of the at least one first base station based on the load prediction information of the at least one first base station and the load prediction information of the at least one second base station.

The storage unit 803 is configured to store information and/or data.

In a possible design, the communication unit 8*oi* may be further configured to: before obtaining the first information of the at least one first base station, send first time information and first input information to the second prediction module, and receive second time information and second input information from the second prediction module.

The first time information includes a load prediction periodicity of the first prediction module and an information exchange periodicity, the first input information indicates the second prediction module to provide the load prediction information of the at least one second base station for the first prediction module, and the load prediction information of the at least one second base station is used to assist the first prediction module in performing comprehensive load prediction on the at least one first base station; the second time information includes a load prediction periodicity of the second prediction module and the information exchange periodicity, the second input information indicates the first prediction module to provide the load prediction information of the at least one first base station for the second prediction module, and the load prediction information of the at least one first base station is used to assist the second prediction module in performing comprehensive load prediction on the at least one second base station; and the information exchange periodicity is a periodicity of information exchange between the first prediction module and the second prediction module.

In a possible design, the communication unit 8*oi* may be further configured to: obtain load fluctuation indication information of the at least one second base station, and send load fluctuation indication information of the at least one first base station, where the load fluctuation indication information indicates the first base station or the second base station to send load fluctuation information when a load fluctuation exceeds a specified threshold in the load prediction periodicity.

In a possible design, when obtaining the load prediction information of the at least one second base station, the communication unit 8*oi* may be further configured to send the load prediction information of the at least one first base station in the information exchange periodicity based on the second input information, where the load prediction information of each first base station is load prediction information indicated by the second input information.

In a possible design, when obtaining the load prediction information of the at least one second base station, the communication unit 8*oi* may be specifically configured to obtain the load prediction information of the at least one second base station in the information exchange periodicity based on the first input information, where the load prediction information of each second base station is load prediction information indicated by the first input information.

In a possible design, the processing unit 802 may be specifically configured to: when separately determining the load prediction information of the at least one first base station based on the first information of the at least one first base station, determine, based on the first information of each first base station, the information about the first cell managed by each first base station, and determine the load prediction information of the first cell of each first base station based on the information about the first cell of each first base station and an established load prediction model of the first cell; or determine the information about the first terminal device of each first base station based on the first information of each first base station, and determine the load prediction information of the first terminal device of each first base station based on the information about the first terminal device of each first base station and an established load prediction model of the first terminal device.

In a possible design, the processing unit 802 may be specifically configured to: when determining the load policy of the at least one first base station based on the load prediction information of the at least one first base station and the load prediction information of the at least one second base station, determine comprehensive load prediction information of the first prediction module based on the load prediction information of the at least one first base station and the load prediction information of the at least one second base station;

obtain comprehensive load prediction information of the second prediction module by using the communication unit 801, and send the comprehensive load prediction information of the first prediction module, where the comprehensive load prediction information of the second prediction module is obtained by the second prediction module based on the load prediction information of the at least one first base station and the load prediction information of the at least one second base station; and determine a load policy of the first prediction module based on the comprehensive load prediction information of the first prediction module and the comprehensive load prediction information of the second prediction module.

In a possible design, the processing unit 802 may be specifically configured to: when determining the comprehensive load prediction information of the first prediction module based on the load prediction information of the at least one first base station and the load prediction information of the at least one second base station, first determine local load prediction information of the at least one first base station based on the load prediction information of the at least one first base station, and then determine flowing-out load prediction information of the at least one second base station based on the load prediction information of the at least one second base station; determine, from the flowing-out load prediction information of the at least one second base station, load prediction information of load that flows to the at least one first base station; and finally determine the comprehensive load prediction information of the first prediction module based on the local load prediction information of the at least one first base station and the load prediction information of the load that flows to the at least one first base station.

In a possible design, the communication unit 801 may be further configured to: obtain a load policy of the second prediction module, and send the load policy of the first prediction module.

The processing unit 802 may be further configured to: determine a final load policy based on the load policy of the first prediction module and the load policy of the second prediction module, and separately send the final load policy to the at least one first base station by using the communication unit.

In a possible design, the apparatus is located in any one of the at least one first base station, or is independent of the at least one first base station; and the second prediction module is located in any one of the at least one second base station, or the second prediction module is independent of the at least one second base station.

Figure 9:
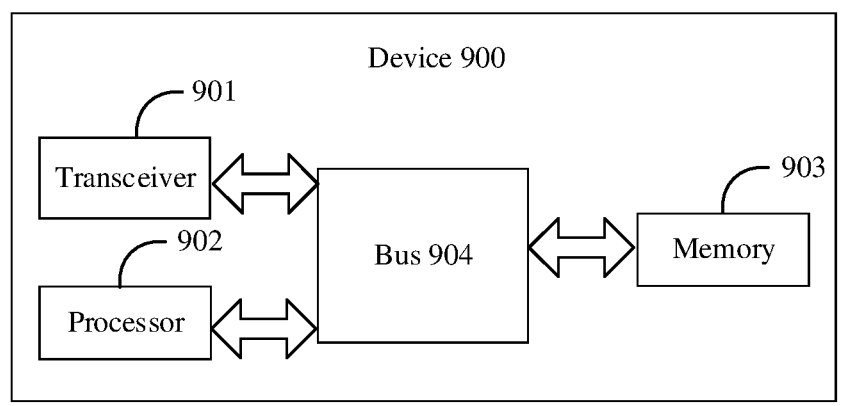
FIG. 9 is a schematic diagram of a structure of a load balancing policy determining device according to an embodiment of this application.

In addition, an embodiment of this application further provides a mobility load balancing policy determining device. The device may have a structure shown in FIG. 9. When the first prediction module is independent of the base station, the mobility load balancing policy determining device may be a device in which the first prediction module is located. When the first prediction module is located inside the base station, the mobility load balancing policy determining device may be a device inside the base station or the base station, or may be a chip or a chip system that can support the first prediction module in implementing the foregoing method. The device 900 shown in FIG. 9 may include at least one processor 902. The at least one processor 902 is configured to: be coupled to a memory 903, and read and execute instructions in the memory, to implement the steps related to the first prediction module in the method provided in embodiments of this application. Optionally, the device 900 may further include a transceiver 901. The transceiver 901 may be configured to support the apparatus 900 in receiving or sending information or data. The transceiver 901 in the device 900 may be configured to implement a function of the communication unit 801. For example, the transceiver 901 may be used by the device 900 to perform steps shown in S301A and S303A in the data transmission method shown in FIG. 3. The processor 902 may be configured to implement a function of the processing unit 802. For example, the processor 902 may be used by the device 900 to perform steps shown in S302A and S304A in the method shown in FIG. 3. In addition, the transceiver 901 may be coupled to an antenna, to support communication performed by the device 900. Optionally, the device 900 may further include the memory 903. The memory stores a computer program and the instructions. The memory 903 may be coupled to the processor 902 and/or the transceiver 901, to support the processor 902 in invoking the computer program and the instructions in the memory 903 to implement a step related to the terminal device in the method provided in embodiments of this application. In addition, the memory 903 may be further configured to store data in the method embodiments of this application, for example, configured to store data and information that are required for supporting the transceiver 901 in implementing exchange.

It should be noted that the device 900 may communicate with an external device by using the transceiver 901, but the device 900 may alternatively communicate with an external device through a communication interface. This may not be specifically limited in this application.

Optionally, the transceiver 901, the processor 902, and the memory 903 may be connected to each other through a bus 904. The bus 904 may be a peripheral component interconnect (PCI) bus, an extended industry standard architecture (EISA) bus, or the like. The bus may be classified into an address bus, a data bus, a control bus, or the like. For ease of representation, only one thick line is used to represent the bus in FIG. 9, but this does not mean that there is only one bus or only one type of bus.

Based on the same concept as the foregoing method embodiment, an embodiment of this application further provides a computer-readable storage medium that stores some instructions. When these instructions are invoked and executed by a computer, the computer is enabled to complete the method in any one of the foregoing method embodiment or the possible designs of the foregoing method embodiment. In this embodiment of this application, no limitation is imposed on the computer-readable storage medium. For example, the computer-readable storage medium may be a RAM (network device random access memory, random access memory), a ROM (read-only memory, read-only memory), or the like.

Based on the same concept as the foregoing method embodiment, this application further provides a computer program product. When being invoked and executed by a computer, the computer program product can complete the method in any one of the foregoing method embodiment and the possible designs of the foregoing method embodiment.

Based on the same concept as the foregoing method embodiment, this application further provides a chip. The chip may include a processor and an interface circuit, to complete the method in any one of the foregoing method embodiment or the possible implementations of the foregoing method embodiment. "Couple" means that two components are directly or indirectly combined with each other. The combination may be fixed or movable, and the combination may allow communication of fluid, electricity, an electrical signal, or another type of signal between two components.

In conclusion, this application provides a load balancing policy determining method. The artificial intelligence AI technology is combined with the conventional mobility load balancing MLB technology, that is, network running load can be accurately predicted using the AI technology, and an accurate MLB policy of high robustness can be inferred based on predicted comprehensive load information, to balance network load, and therefore better improve network performance.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

An embodiment of this application provides a computer-readable storage medium that stores a computer program. The computer program includes instructions used to perform the foregoing method embodiment.

An embodiment of this application provides a computer program product including instructions. When the computer program product runs on a computer, the computer is enabled to perform the foregoing method embodiment.

With descriptions of the foregoing implementations, a person skilled in the art may clearly understand that embodiments of this application may be implemented by hardware, firmware or a combination thereof. When embodiments are implemented by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a computer. Examples of the computer-readable medium include but are not limited to: a RAM, a ROM, an electrically erasable programmable read only memory (EEPROM), a compact disc read-only memory (CD-ROM) or another optical disc storage, a disk storage medium or another disk storage device, or any other medium that can be used to carry or store expected program code in an instruction or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk (disk) and disc (disc) used in embodiments of this application includes a compact disc (CD), a laser disc, an optical disc, a digital video disc (DVD), a floppy disk and a Blu-ray disc, where the disk generally copies data in a magnetic manner, and the disc copies data optically in a laser manner. The foregoing combination should also be included in the protection scope of the computer-readable medium.

In conclusion, the foregoing descriptions are merely embodiments of this application, but are not intended to limit the protection scope of this application. Any modification, equivalent replacement, and improvement made according to the disclosure of this application shall fall within the protection scope of this application.

What is claimed is:

1. A method, comprising:
    obtaining, by a first device, first information of at least one first base station, wherein the first device performs load prediction on the at least one first base station based on the first information, and the first information of one first base station comprises at least a first portion of information associated with a first cell, wherein the first cell is managed by the first base station, and further comprises at least a second portion of information associated with a first terminal device located in the first cell;
    determining, by the first device, first load prediction information of the at least one first base station based on the first information of the at least one first base station, wherein at least a portion of the first load prediction information corresponding to each first base station comprises first load prediction information associated with a corresponding first cell or second load prediction information associated with a corresponding first terminal device;
    obtaining, by the first device, second load prediction information of at least one second base station from a second device, wherein the second load prediction information of each second base station comprises at least third load prediction information associated with a corresponding second cell or fourth load prediction information associated with a second terminal device located in the second cell, and wherein the second base station manages the second cell; and
    determining, by the first device, a load policy of the at least one first base station based on the first load prediction information of the at least one first base station and further based on flowing-out load prediction information that is of a load that flows to the at least one first base station and that is determined from the second load prediction information of the at least one second base station.

2. The method according to claim 1, the method further comprising:
    performing, before the obtaining, by the first device, the first information of the at least one first base station:
        sending, by the first device, first time information and first input information to the second device; and
        receiving second time information and second input information from the second device, wherein the first time information comprises a load prediction periodicity of the first device, and further comprises an information exchange periodicity, wherein the first input information indicates the second device to provide the second load prediction information of the at least one second base station for the first device, and the first device performs load prediction on the at least one first base station based on the second load prediction information of the at least one second base station, wherein the second time information comprises a second load prediction periodicity of the second device and the information exchange periodicity, wherein the second input information indicates the first device to provide the second load prediction information of the at least one first base station for the second device, wherein the second device performs load prediction on the at least one second base station based on the second load prediction information of the at least one first base station, and wherein the information exchange periodicity represents a periodicity of information exchange between the first device and the second device.

3. The method according to claim 2, the method further comprising:
    obtaining, by the first device, load fluctuation indication information of the at least one second base station; and
    sending load fluctuation indication information of the at least one first base station, wherein the load fluctuation indication information indicates the first base station or the second base station to send load fluctuation information in response to a load fluctuation exceeding a specified threshold within the load prediction periodicity.

4. The method according to claim 2, the method further comprising:
    performing, in response to the first device obtaining the second load prediction information of the at least one second base station:
        sending, by the first device, the first load prediction information of the at least one first base station within the information exchange periodicity based on the second input information, wherein the first load prediction information of each first base station is indicated by the second input information.

5. The method according to claim 2, wherein obtaining, by the first device, the second load prediction information comprises:
    obtaining, by the first device, the second load prediction information of the at least one second base station within the information exchange periodicity based on the first input information, wherein the load prediction information of each second base station is indicated by the first input information.

6. The method according to claim 1, wherein determining, by the first device, the first load prediction information of the at least one first base station based on the first information of the at least one first base station comprises:
    determining, by the first device based on at least a portion of the first information of each first base station, at least the first portion of information associated with the first cell managed by each first base station, and determining, by the first device, the first load prediction information of the first cell of each first base station based on at least the first portion of information associated with the first cell of each first base station and an established load prediction model of the first cell; or
    determining, by the first device, the second portion of information associated with the first terminal device of each first base station based on the first information of each first base station, and determining, by the first device, the load prediction information of the first terminal device of each first base station based on at least the second portion of information associated with the first terminal device of each first base station and an established load prediction model of the first terminal device.

7. The method according to claim 6, wherein determining the load policy of the at least one first base station comprises:

determining, by the first device, first comprehensive load prediction information of the first device based on the first load prediction information of the at least one first base station and the second load prediction information of the at least one second base station;

obtaining, by the first device, second comprehensive load prediction information of the second device, and sending the first comprehensive load prediction information of the first device, wherein the second comprehensive load prediction information of the second device is obtained by the second device based on the first load prediction information of the at least one first base station and the second load prediction information of the at least one second base station; and determining, by the first device, a second load policy of the first device based on the first comprehensive load prediction information of the first device and the second comprehensive load prediction information of the second device.

8. An apparatus comprising:
at least one processor; and
at least one non-transitory computer readable memory connected to the at least one processor and including computer program code, wherein the at least one non-transitory computer readable memory and the computer program code are configured, with the at least one processor, to cause the apparatus to at least:
obtain first information of at least one first base station, and performs load prediction on the at least one first base station based on the first information, the first information of the at least one first base station comprises at least a first portion of information about a first cell, wherein the first cell is managed by the first base station, and further comprises at least a second portion of information about a first terminal device located in the first cell;
determine first load prediction information of the at least one first base station based on the first information of the at least one first base station, wherein the at least a portion of the first load prediction information of each first base station comprises first load prediction information associated with a corresponding first cell or second load prediction information associated with a corresponding first terminal device;
obtain second load prediction information of at least one second base station from a second device, wherein the second load prediction information of each second base station comprises at least third load prediction information associated with a corresponding second cell or fourth load prediction information associated with a second terminal device located in the second cell, and wherein the second base station manages the second cell; and
determine a load policy of the at least one first base station based on the first load prediction information of the at least one first base station and further based on flowing-out load prediction information that is of a load that flows to the at least one first base station and that is determined from the second load prediction information of the at least one second base station.

9. The apparatus according to claim 8, wherein the at least one non-transitory computer readable memory and the computer program code are further configured, with the at least one processor, to cause the apparatus to at least:
perform, before the apparatus obtains the first information of the at least one first base station:
send first time information and first input information to the second device; and
receive second time information and second input information from the second device, wherein the first time information comprises a load prediction periodicity, and further comprises an information exchange periodicity, wherein the first input information indicates the second device to provide the second load prediction information of the at least one second base station, and the apparatus performs load prediction on the at least one first base station based on the second load prediction information of the at least one second base station, the second time information comprises a second load prediction periodicity of the second device and the information exchange periodicity, the second input information indicates to provide the second load prediction information of the at least one first base station for the second device, and the second device performs load prediction on the at least one second base station based on the second load prediction information of the at least one first base station, and the information exchange periodicity represents a periodicity of information exchange between the apparatus and the second device.

10. The apparatus according to claim 9, wherein the at least one non-transitory computer readable memory and the computer program code are further configured, with the at least one processor, to cause the apparatus to at least:
obtain first load fluctuation indication information of the at least one second base station; and
send second load fluctuation indication information of the at least one first base station, wherein the first load fluctuation indication information or the second load fluctuation indication information indicates the first base station or the second base station to send the first load fluctuation indication information or the second load fluctuation indication information in response to a load fluctuation exceeding a specified threshold within the load prediction periodicity.

11. The apparatus according to claim 9, wherein the at least one non-transitory computer readable memory and the computer program code are further configured, with the at least one processor, to cause the apparatus to at least:
perform, in response to obtaining the second load prediction information of the at least one second base station:
send the first load prediction information of the at least one first base station within the information exchange periodicity based on the second input information, wherein at least a portion of the first load prediction information of each first base station is indicated by the second input information.

12. The apparatus according to claim 9, wherein the at least one non-transitory computer readable memory and the computer program code being configured, with the at least one processor, to cause the apparatus to obtain the second load prediction information comprises the at least one non-transitory computer readable memory and the computer program code are further configured, with the at least one processor, to cause the apparatus to at least:
obtain the second load prediction information of the at least one second base station within the information exchange periodicity based on the first input information, wherein at least a portion of the second load prediction information of each second base station is indicated by the first input information.

13. The apparatus according to claim 8, wherein the at least one non-transitory computer readable memory and the computer program code being configured, with the at least one processor, to cause the apparatus to determine the first load prediction information of the at least one first base station based on the first information of the at least one first base station comprises the at least one non-transitory computer readable memory and the computer program code are further configured, with the at least one processor, to cause the apparatus to at least:
- determine, based on at least a portion of the first information of each first base station, at least the first portion of information associated with the first cell managed by each first base station, and determine the first load prediction information of the first cell of each first base station based on at least the first portion of information associated with the first cell of each first base station and an established load prediction model of the first cell; or
- determine the second portion of information associated with the first terminal device of each first base station based on the first information of each first base station, and determining, the first load prediction information of the first terminal device of each first base station based on at least the second portion of information associated with the first terminal device of each first base station and an established load prediction model of the first terminal device.

14. The apparatus according to claim 13, wherein the at least one non-transitory computer readable memory and the computer program code being configured, with the at least one processor, to cause the apparatus to determine the load policy of the at least one first base station comprises the at least one non-transitory computer readable memory and the computer program code being further configured, with the at least one processor, to cause the apparatus to at least:
- determine first comprehensive load prediction information based on the first load prediction information of the at least one first base station and the second load prediction information of the at least one second base station;
- obtain second comprehensive load prediction information of the second device, and sending the first comprehensive load prediction information, wherein the second comprehensive load prediction information of the second device is obtained by the second device based on the first load prediction information of the at least one first base station and the second load prediction information of the at least one second base station; and
- determine a second load policy based on the first comprehensive load prediction information and the second comprehensive load prediction information of the second device.

15. An apparatus comprising:
at least one processor; and
at least one non-transitory computer readable memory connected to the at least one processor and including computer program code, wherein the at least one non-transitory computer readable memory and the computer program code are configured, with the at least one processor, to cause the apparatus to at least:
- obtain second information of at least one second base station, and perform load prediction on the at least one second base station based on the second information, and the second information of one second base station comprises at least a first portion of information associated with a second cell, wherein the second base station manages the second cell, and further comprises (ii) at least a second portion of information associated with a second terminal device located in the second cell;
- determine second load prediction information of the at least one second base station based on the second information of the at least one second base station, wherein at least a portion of the second load prediction information of each second base station comprises first load prediction information associated with a corresponding second cell or second load prediction information associated with a corresponding second terminal device;
- obtain first load prediction information of at least one first base station, wherein the first load prediction information of each first base station comprises at least third load prediction information associated with a corresponding first cell or fourth load prediction information associated with a first terminal device located in the first cell, and wherein the first base station manages the first cell; and
- determine a load policy of the at least one second base station based on the second load prediction information of the at least one second base station and further based on flowing-out load prediction information that is of a load that flows to the at least one second base station and that is determined from the first load prediction information of the at least one first base station.

16. The apparatus according to claim 15, wherein the at least one non-transitory computer readable memory and the computer program code are further configured, with the at least one processor, to cause the apparatus to at least:
- perform, before the apparatus obtains the second information of the at least one second base station:
  - send second time information and second input information to a first device; and
  - receive first time information and first input information from the first device, wherein the first time information comprises (i) a load prediction periodicity of the first device, and further comprises (ii) an information exchange periodicity, wherein the first input information indicates to provide the second load prediction information of the at least one second base station for the first device, and the at least one first base station performs load prediction based on the second load prediction information of the at least one second base station, the second time information comprises a second load prediction periodicity and the information exchange periodicity, the second input information indicates the first device to provide the first load prediction information of the at least one first base station, and performs load prediction on the at least one second base station based on the first load prediction information, and the information exchange periodicity is a periodicity of information exchange between the first device and the apparatus.

17. The apparatus according to claim 16, wherein the at least one non-transitory computer readable memory and the computer program code are further configured, with the at least one processor, to cause the apparatus to at least:
- obtain first load fluctuation indication information of the at least one first base station; and
- send second load fluctuation indication information of the at least one second base station, wherein the first load fluctuation indication information or the second load fluctuation indication information indicates the first base station or the second base station to send the first load fluctuation indication information or the second load fluctuation indication information in response to a load fluctuation exceeding a specified threshold in the load prediction periodicity.

18. The apparatus according to claim 16, wherein the at least one non-transitory computer readable memory and the computer program code are further configured, with the at least one processor, to cause the apparatus to at least:

perform, in response to obtaining the first load prediction information of the at least one first base station:

send the second load prediction information of the at least one second base station within the information exchange periodicity based on the first input information, wherein at least a portion of the second load prediction information of each second base station is load prediction information indicated by the first input information.

19. The apparatus according to claim 16, wherein the at least one non-transitory computer readable memory and the computer program code being configured, with the at least one processor, to cause the apparatus to obtain the first load prediction information of the at least one first base station comprises the at least one non-transitory computer readable memory and the computer program code are further configured, with the at least one processor, to cause the apparatus to at least:

obtain the first load prediction information of the at least one first base station within the information exchange periodicity based on the second input information, wherein at least a portion of the first load prediction information of each first base station is indicated by the second input information.

20. The apparatus according to claim 15, wherein the at least one non-transitory computer readable memory and the computer program code being configured, with the at least one processor, to cause the apparatus to determine the second load prediction information of the at least one second base station based on the second information of the at least one second base station comprises the at least one non-transitory computer readable memory and the computer program code are further configured, with the at least one processor, to cause the apparatus to at least:

determine, based on at least a portion of the second information of each second base station, at least a first portion of information associated with the second cell managed by each second base station based on the second information of each second base station, and determine the second load prediction information of the second cell of each second base station based on at least the first portion of information about the second cell of each second base station and an established load prediction model of the second cell; or determine the second portion of information about the second terminal device of each second base station based on the second information of each second base station, and determine the second load prediction information of the second terminal device of each second base station based on at least the second portion of information associated with the second terminal device of each second base station and an established load prediction model of the second terminal device.

* * * * *